United States Patent
Sato et al.

(10) Patent No.: US 11,924,736 B2
(45) Date of Patent: Mar. 5, 2024

(54) WIRELESS COMMUNICATION UNIT AND WIRELESS NETWORK SYSTEM USING THE SAME

(71) Applicant: Japan Radio Co., Ltd., Tokyo (JP)

(72) Inventors: Katsuhiko Sato, Tokyo (JP); Yusuke Egawa, Tokyo (JP); Kunimitsu Arai, Tokyo (JP); Satoshi Maeda, Tokyo (JP); Sadayuki Katsumata, Tokyo (JP)

(73) Assignee: Japan Radio Co., Ltd., Tokyo (JP)

( * ) Notice: Subject to any disclaimer, the term of this patent is extended or adjusted under 35 U.S.C. 154(b) by 342 days.

(21) Appl. No.: 17/611,014

(22) PCT Filed: Dec. 23, 2019

(86) PCT No.: PCT/JP2019/050427
§ 371 (c)(1),
(2) Date: Nov. 12, 2021

(87) PCT Pub. No.: WO2020/230355
PCT Pub. Date: Nov. 19, 2020

(65) Prior Publication Data
US 2022/0232451 A1 Jul. 21, 2022

(30) Foreign Application Priority Data
May 14, 2019 (JP) ................................ 2019-091671

(51) Int. Cl.
*H04W 40/22* (2009.01)
*H04W 76/11* (2018.01)

(52) U.S. Cl.
CPC ............ *H04W 40/22* (2013.01); *H04W 76/11* (2018.02)

(58) Field of Classification Search
CPC ..... H04W 40/22; H04W 76/11; H04W 88/04; H04W 76/12; H04W 92/20; H04W 16/26
See application file for complete search history.

(56) References Cited

U.S. PATENT DOCUMENTS

2014/0220923 A1    8/2014   Shoshan et al.
2019/0141561 A1    5/2019   Altay et al.

FOREIGN PATENT DOCUMENTS

EP        3 439 424 A1    2/2019
JP    2015-216564 A    12/2015
(Continued)

OTHER PUBLICATIONS $3^{rd}$ Generation Partnership Project; Technical Specification Group Services and System Aspects; Study on architecture enhancements to support isolated Evolved Universal Terrestrial Radio Access Network (E-UTRAN) operation for public safety (Release 13), 3GPP TR 23.797 [online], V13.0.0 (Jun. 2015), Jun. 21, 2015, pp. 1-12 <URL: https://www.3gpp.org/ftp/Specs/archive/237_series/23.797/23797-d00.zip>.

(Continued)

*Primary Examiner* — Marisol Figueroa
(74) *Attorney, Agent, or Firm* — DLA Piper LLP (US)

(57) ABSTRACT

A wireless communication unit and a wireless network system enable a plurality of wireless communication units to be wirelessly cooperated with a simple structure, can easily realize cooperative operations, and can execute IP packet transfer control without acquiring communication path information from an external network. A relay wireless communication portion that is connectable to an upstream unit (upstream wireless base station portion) that is another upstream wireless communication unit via an upstream inter-unit wireless bearer is provided. A wireless base station portion is connectable to a downstream unit (downstream relay wireless communication portion) that is another downstream wireless communication unit via a downstream inter-unit wireless bearer. The downstream inter-unit wireless bearer and the upstream inter-unit wireless bearer are constructed according to a wireless protocol stack of the same (Continued)

method as that of a terminal wireless bearer that connects a mobile terminal to each wireless base station portion.

16 Claims, 32 Drawing Sheets

(56) References Cited

FOREIGN PATENT DOCUMENTS

| | | |
|---|---|---|
| JP | 2016-12841 A | 1/2016 |
| JP | 2018-93492 A | 6/2018 |
| JP | 2018-137661 A | 8/2018 |
| JP | 2018-137662 A | 8/2018 |
| JP | 2018-137663 A | 8/2018 |
| JP | 2018-137664 A | 8/2018 |
| JP | 2018-137665 A | 8/2018 |
| JP | 2018-137666 A | 8/2018 |

OTHER PUBLICATIONS

Extended European Search Report dated Dec. 16, 2022, of counterpart European Patent Application No. 19928870.5.
Office Action dated May 24, 2022, of counterpart Indian Patent Application No. 202127055767.
Notice of Reasons for Refusal dated Jun. 6, 2023, of counterpart Japanese Patent Application No. 2019-091671, along with an English translation.

| MAD01 | MAD02 | MAD03 | MAD04 |
|-------|-------|-------|--------|
| UEAD11 | UEAD21 | UEAD31 | UEAD041 |
| UEAD12 | UEAD22 | UEAD32 | UEAD042 |
| UEAD13 | UEAD23 | UEAD33 | UEAD043 |
| UEAD14 | UEAD24 | UEAD34 | UEAD044 |
| . . | . . | . . | . . |

FIG. 27
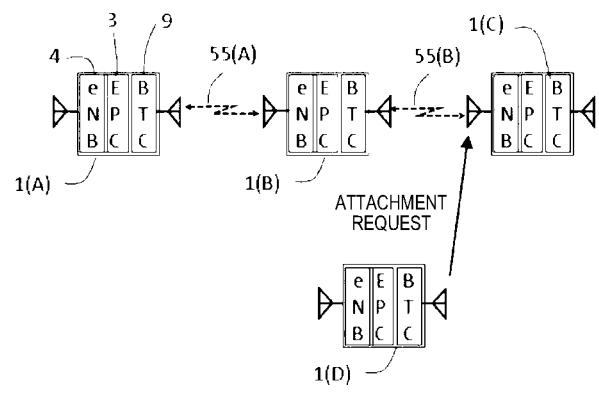
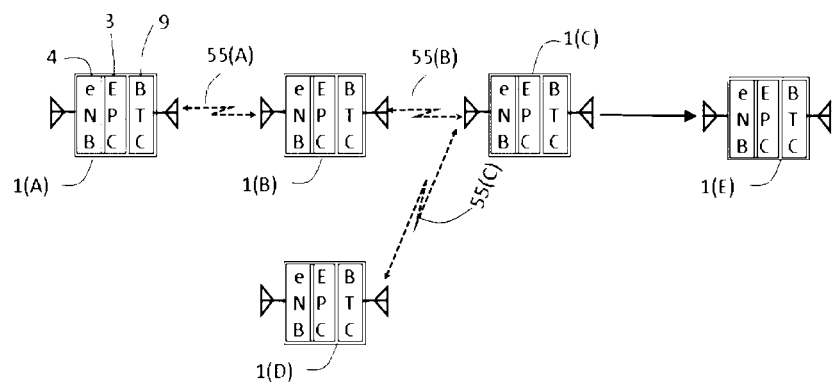

WIRELESS COMMUNICATION UNIT AND WIRELESS NETWORK SYSTEM USING THE SAME

TECHNICAL FIELD

This disclosure relates to a wireless communication unit that performs wireless network communication with a mobile terminal in accordance with a communication protocol stack defined by Third Generation Partnership Project (3GPP), and a wireless communication unit that can be suitably used to support coverage of a wide area by easily realizing a cooperative operation between a plurality of units, and a wireless network system using the wireless communication unit.

BACKGROUND

In a wireless communication network with a high-speed communication standard based on 3GPP specifications (for example, Long Term Evolution (LTE) or Worldwide Interoperability for Microwave Access (WiMAX)), it is necessary to construct the Evolved Packet Core (EPC) accommodating a wireless communication access network in an area, and a wireless base station to which a mobile terminal is connected is subjected to control for transmission and reception of IP packets via the EPC. On the other hand, with the spread of mobile terminals such as mobile phones, smartphones or tablet PCs, even in areas where EPCs or wireless base stations are not developed in terms of infrastructure such as areas at sea, depopulated areas, or areas where communication functions have been lost due to disasters, (hereinafter, also referred to as "no-wireless-service regions"), there is an increasing demand for mobile terminals.

To meet such demands, for example, Japanese Unexamined Patent Application Publication No. 2016-12841 proposes a composite wireless communication unit in which a wireless base station and an EPC function portion are integrated. By installing such a wireless communication unit in the above-described no-wireless-service region, a small-scale communicable area is constructed by a wireless base station portion included in the unit, and the EPC function portion in the unit controls communication, making it possible to perform wireless communication between a plurality of mobile terminals connected to the wireless base station portion in a form in which the EPC function portion in the unit controls communication. However, a communication area that can be covered by one wireless communication unit is narrow, and a communication capacity is also restricted. In that instance, it is possible to dispose a plurality of wireless communication units in a no-wireless-service region, but there is a problem in that communication cooperation between the units is not considered, and communication between mobile terminals connected to different composite devices is not possible. When communication traffic in an area becomes excessive such as when the number of connected mobile terminals increases or a large amount of data such as video data is transmitted and received, there is a problem in that problems such as congestion are likely to occur.

Therefore, Japanese Unexamined Patent Application Publication Nos. 2018-137661, 2018-137662, 2018-137663, 2018-137664, 2018-137665 and 2018-137666 disclose a configuration in which a plurality of wireless communication units are caused to cooperate and communication traffic from a mobile terminal is distributed and transferred to each wireless communication unit. Specifically, FIG. 6 in JP '664 discloses a form via a satellite device as a cooperation path between wireless communication units for offloading communication with a mobile terminal.

JP '661, JP '662, JP '663, JP '664, JP '665 and JP '666 disclose systems where a plurality of wireless communication units are connected to each other (for example, FIG. 1 in JP '661). Except for the offload mode via the satellite device described above, no specific disclosure has been made as to what kind of entity this connection is configured with. However, when the wireless communication units are considered to be connected by wire, if the wireless communication units are to be distributed and disposed in a relatively wide communication area inside a no-wireless-service region, a communication cable connecting devices will be very long. As a result, there is a problem in that the cost of constructing a connection infrastructure rises, for example, because signal quality and communication capacity deteriorate and a relay device is required to prevent the deterioration. In applications in which wireless communication units are mounted on moving objects such as trains, automobiles, and ships, it is physically impossible to connect respective wireless communication units via a cable. When an IP packet is to be transferred via a network, it is necessary to ascertain communication path information to a transmission destination node. For example, when connection to an external network is possible, communication path information such as a routing table can be acquired by accessing a home subscriber server (HSS) or the like. However, when a closed wireless network is constructed in a no-wireless-service region as described above, an environment in which the HSS can be used can hardly be expected, and it is very difficult to retrofit a system of communication path information that is just right in a wireless system in which a mobile terminal constantly moves between cells and repeatedly performs connection and disconnection.

It could therefore be helpful to provide a wireless communication unit in which a plurality of wireless communication units can be caused to wirelessly cooperate with a simple structure, a cooperative operation between the plurality of units can be easily realized, and transfer control of IP packets between the plurality of units can be executed even if communication path information is not acquired from an external network, and a wireless network system using the wireless communication unit.

SUMMARY

We thus provide:

A wireless communication unit that performs wireless network communication with a mobile terminal in accordance with a communication protocol stack, the wireless communication unit including a wireless base station portion to which the mobile terminal is connectable via a terminal wireless bearer; an Evolved Packet Core (EPC) function portion that is connected by wire to the wireless base station portion and functions as an upper network control portion for the wireless base station portion; and a relay wireless communication portion connected by wire to the EPC function portion, and is also connectable to a wireless base station portion (hereinafter an upstream wireless base station portion) of an upstream unit that is another first wireless communication unit via an upstream inter-unit wireless bearer, in which the wireless base station portion is connectable to a relay wireless communication portion (hereinafter a downstream relay wireless communication portion) of a downstream unit that is another second wireless communication unit via a downstream inter-unit wireless bearer, in which the EPC function portion transmits a downstream inter-unit wireless bearer setting request to the wireless base station portion, and the wireless base station portion constructs the downstream inter-unit wireless bearer together with the downstream relay wireless communication portion according to conditions indicated by the downstream inter-unit wireless bearer setting request, in which the EPC function portion transmits a terminal wireless bearer setting request to the wireless base station portion, and the wireless base station portion constructs the terminal wireless bearer together with the mobile terminal according to conditions indicated by the terminal wireless bearer setting request, in which the relay wireless communication portion receives an upstream inter-unit wireless bearer setting request issued by an EPC function portion (hereinafter an upstream EPC function portion) of the upstream unit, and constructs the upstream inter-unit wireless bearer together with the upstream wireless base station portion according to conditions indicated by the upstream inter-unit wireless bearer setting request, and in which the EPC function portion includes a connected terminal node registration section in which, with respect to a plurality of the mobile terminals connected to the wireless base station portion via the terminal wireless bearer within a communication area of the wireless base station portion, pieces of node identification information of the connected mobile terminals are registered, and performs control of collating a transmission destination node of an IP packet transferred from the wireless base station portion with registered content of the connected terminal node registration section, transferring, when the transmission destination node indicates a mobile terminal corresponding to any of the pieces of node identification information registered in the connected terminal node registration section, the IP packet to the mobile terminal in a form of returning the IP packet at the wireless base station portion, and transferring, when the transmission destination node indicates a node that is not registered in the connected terminal node registration section, the IP packet to a transmission destination outside the wireless communication unit from at least one of the relay wireless communication portion and the wireless base station portion.

A wireless communication system includes a wireless communication unit group including two or more wireless communication units disposed to be sequentially adjacent, in which each of the wireless communication unit is configured to perform wireless network communication with a mobile terminal in accordance with a communication protocol stack defined in Third Generation Partnership Project (3GPP), and includes a wireless base station portion to which the mobile terminal is connectable via a terminal wireless bearer, an Evolved Packet Core (EPC) function portion connected by wire to the wireless base station portion and functions as an upper network control portion for the wireless base station portion, and a relay wireless communication portion connected by wire to the EPC function portion, and is also connectable to a wireless base station portion (hereinafter an upstream wireless base station portion) of an upstream unit that is another first wireless communication unit via an upstream inter-unit wireless bearer, in which the wireless base station portion is connectable to a relay wireless communication portion (hereinafter a downstream relay wireless communication portion) of a downstream unit that is another second wireless communication unit via a downstream inter-unit wireless bearer, in which the EPC function portion transmits a terminal wireless bearer setting request to the wireless base station portion, and the wireless base station portion constructs the terminal wireless bearer together with the mobile terminal according to conditions indicated by the terminal wireless bearer setting request, in which the relay wireless communication portion receives an upstream inter-unit wireless bearer setting request issued by an EPC function portion (hereinafter referred to as an upstream EPC function portion) of the upstream unit, and constructs the upstream inter-unit wireless bearer together with the upstream wireless base station portion according to conditions indicated by the upstream inter-unit wireless bearer setting request, and in which the EPC function portion includes a connected terminal node registration section in which, with respect to a plurality of the mobile terminals connected to the wireless base station portion via the terminal wireless bearer within a communication area of the wireless base station portion, pieces of node identification information of the connected mobile terminals are registered, and performs control of collating a transmission destination node of an IP packet transferred from the wireless base station portion with registered content of the connected terminal node registration section, transferring, when the transmission destination node indicates a mobile terminal corresponding to any of the pieces of node identification information registered in the connected terminal node registration section, the IP packet to the mobile terminal in a form of returning the IP packet at the wireless base station portion, and transferring, when the transmission destination node indicates a node that is not registered in the connected terminal node registration section, the IP packet to a transmission destination outside the wireless communication unit from at least one of the relay wireless communication portion and the wireless base station portion, in which the wireless communication unit group is connected by the inter-unit wireless bearer in a positional relationship in which base station cells of a pair of wireless communication units adjacent to each other partially overlap each other, and in which a mobile terminal connected to one of the pair of wireless communication units and a mobile terminal connected to the other thereof perform transmission and reception of the IP packet via the pair of wireless communication units and the inter-unit wireless bearer connecting the pair of wireless communication units.

An upstream inter-unit wireless bearer and a downstream inter-unit wireless bearer differ only in whether they are constructed upstream or downstream of a wireless communication unit of interest, and have the same functional entity as that of a wireless bearer that connects a relay wireless communication portion and a wireless base station portion of a pair of adjacent wireless communication units to each other. Hereinafter, when the upstream inter-unit wireless bearer and the downstream inter-unit wireless bearer are collectively referred to, they are simply referred to as an "inter-unit wireless bearer."

The wireless communication unit is provided with a relay wireless communication portion connectable to an upstream unit (upstream wireless base station portion) that is another upstream wireless communication unit via an upstream inter-unit wireless bearer. The wireless base station portion is connectable to a downstream unit (downstream relay wireless communication portion) that is another downstream wireless communication unit via a downstream inter-unit wireless bearer. The EPC function portion includes a connected terminal node registration section in which, with respect to a plurality of the mobile terminals connected to the wireless base station portion via the terminal wireless bearer in a communication area of the wireless base station portion, pieces of node identification information of the connected mobile terminals are registered, and performs control of collating a transmission destination node of an IP packet transferred from the wireless base station portion with registered content of the connected terminal node registration section, transferring, when the transmission destination node indicates a mobile terminal corresponding to any of the pieces of node identification information registered in the connected terminal node registration section, the IP packet to the mobile terminal in a form of returning the IP packet at the wireless base station portion, and transferring, when the transmission destination node indicates a node that is not registered in the connected terminal node registration section, the IP packet to a transmission destination outside the wireless communication unit from at least one of the relay wireless communication portion and the wireless base station portion. That is, in the wireless communication unit, the EPC function portion acquires the node identification information and registers the node identification information in the connected terminal node registration section each time a mobile terminal is connected, and thus it is possible to easily ascertain whether a transmission destination of the IP packet that is a transfer target is a subordinate mobile terminal or a mobile terminal outside the unit. As a result, the EPC function portion can execute transfer control for the IP packet between a plurality of units without acquiring communication path information from the external network.

In the relay wireless communication portion of a certain wireless communication unit, a plurality of wireless communication units disposed sequentially adjacent to each other in a geometric topology can be sequentially connected by an inter-unit wireless bearer, and thus the wireless network system can be constructed. The wireless network system is constructed by the wireless communication unit group, and thus it is possible to perform transmission and reception of IP packets without any problem between a mobile terminal connected to one of a pair of sequentially connected wireless communication units and a mobile terminal connected to the other in a positional relationship in which base station cells partially overlap.

BRIEF DESCRIPTION OF THE DRAWINGS

FIG. 16 is a conceptual diagram of a transfer table.

FIG. 27 is a diagram illustrating an example of a process of performing attachment and connection by adding a new wireless communication unit to a leading wireless communication unit of a wireless communication network system.

REFERENCE SIGNS LIST

Figure 1:
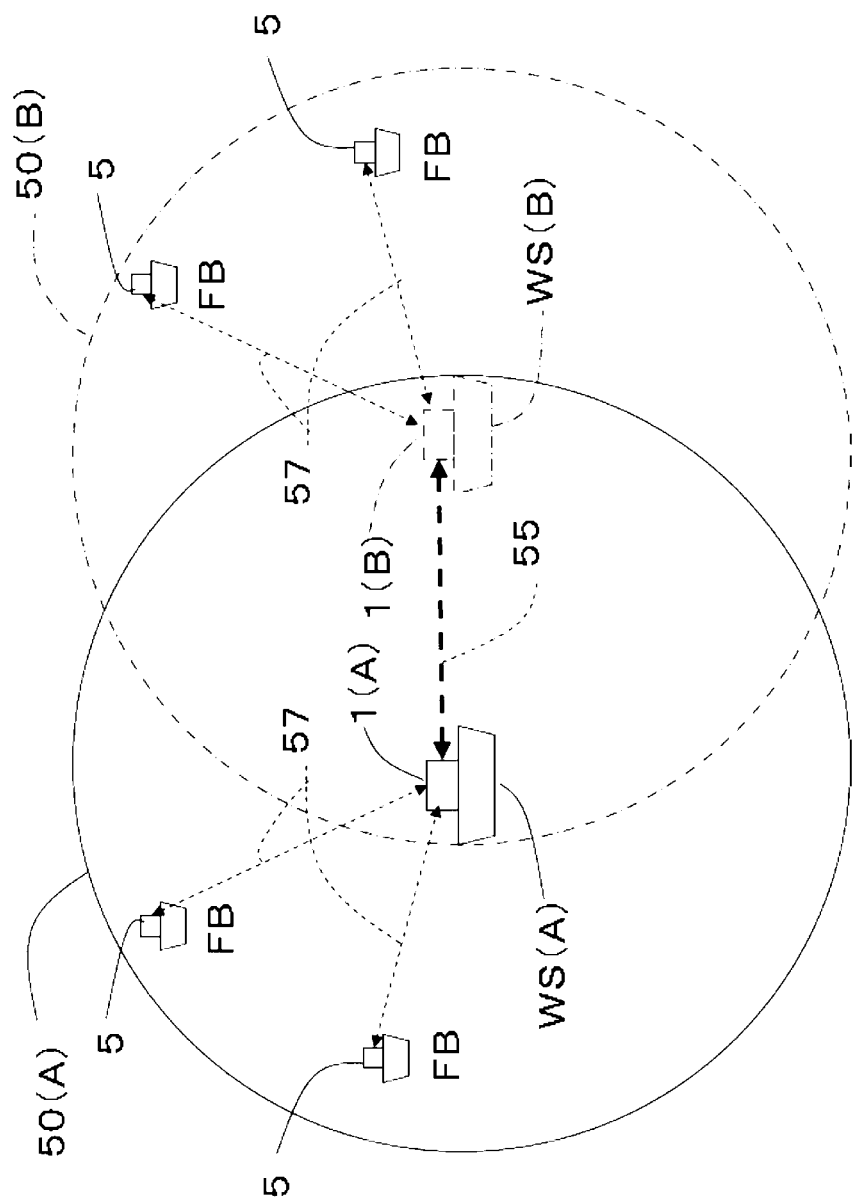
FIG. 1 is a schematic diagram illustrating the concept of a wireless communication unit pair that is a constituent unit of a wireless network system.

1(A), 1(B) Wireless communication unit
WS(A), WS(B) Large ship
2 MME
3 EPC function portion
301 CPU
302 RAM
303 Mask ROM 304A Upstream communication interface
304B Downstream communication interface
305 Flash memory
305a Communication firmware
305b MME entity
305c S-GW entity
305d P-GW entity
305e Transfer table
305f Connected terminal node registration section
305g Channel map
306 Bus
21 Secondary battery module
22 Power supply circuit portion
23 Portable housing
30, 31 Communication bus
4 Wireless base station portion
401 CPU
402 RAM
403 Mask ROM
404 Communication interface
405 Flash memory
405a Communication firmware
406 Bus
412 Wireless communication portion
5 UE (mobile terminal)
6 S-GW
7 P-GW
8 Router
9 Relay wireless communication portion
901 CPU
902 RAM
903 Mask ROM
905 Flash memory
905a Communication firmware
906 Bus
912 Wireless communication portion
50(A), 50(B) Communication area
55 Inter-unit wireless bearer
57 Terminal wireless bearer

DETAILED DESCRIPTION

Hereinafter, examples of our wireless communication units and systems will be described with reference to the accompanying drawings.

FIG. 1 is a schematic diagram illustrating the concept of an example of a wireless communication unit pair that is a constituent unit of a wireless network system. The wireless communication unit pair includes wireless communication units 1(A) and 1(B) having the same configuration (hereinafter, also a pair of wireless communication units 1(A) and 1(B)), and is configured to perform wireless communication with a UE (mobile terminal) 5 according to a communication protocol stack of a method defined in 3GPP (in this example, LTE, but other methods such as WiMAX may be used).

The wireless communication units 1(A) and 1(B) are respectively installed on large ships WS(A) and WS(B), which are moving objects, and are wirelessly connected by an inter-unit wireless bearer 55 that will be described in detail later. The wireless communication units 1(A) and 1(B) respectively form cells 50(A) and 50(B) to which the UEs (mobile terminals) 5 are connectable. Small ships FB (for example, fishing ships and tugboats) perform fishing operation around the large ships WS(A) and WS(B) (for example, fishing motherships and tankers), and a crew of the small ship FB in the cell 50(A) or the cell 50(B) carries the UE 5.

The UEs 5 are respectively wirelessly connected to the nearest wireless communication units 1(A) and 1(B) by terminal wireless bearers 57. The UEs 5 may be carried by crews of the large ships WS(A) and WS(B). Installation destinations of the wireless communication units 1(A) and 1(B) may be moving objects (vehicles or the like) other than ships, or the wireless communication units 1(A) and 1(B) may be fixedly disposed at desired installation destinations on land, for example.

Figure 2:
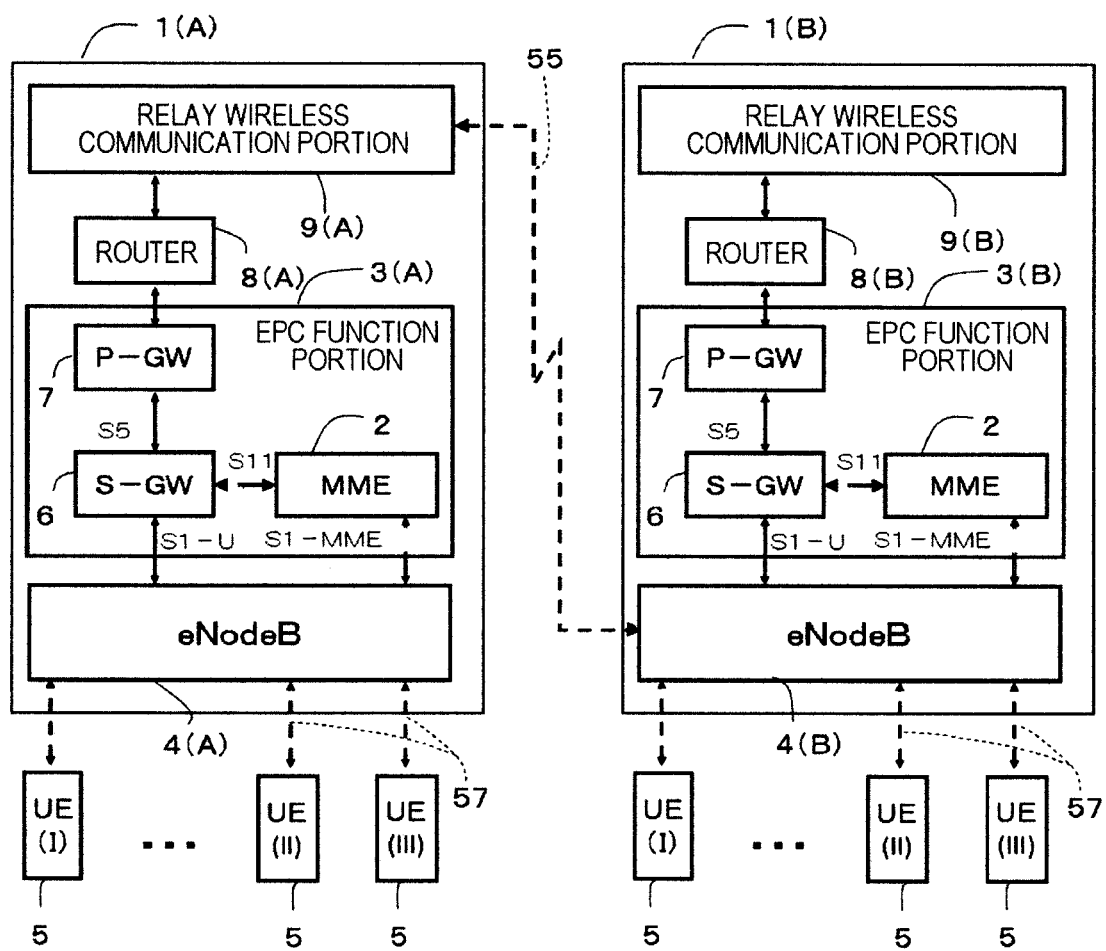
FIG. 2 is a block diagram illustrating an outline of an electrical configuration of the wireless communication unit pair in FIG. 1.

FIG. 2 illustrates a functional block configuration of the wireless communication units 1(A) and 1(B). The wireless communication units 1(A) and 1(B) both have the same electrical configuration. When a plurality of wireless communication units and their constituents are illustrated to be distinguished from each other in this disclosure, the identical numbers are assigned to corresponding constituents, and uppercase letters in parentheses are given after the numbers. On the other hand, when each constituent is illustrated without distinguishing between wireless communication units, the uppercase letters in a parentheses may be omitted. Hereinafter, the reference numerals on the wireless communication unit 1(A) side will be mainly used, but the wireless communication unit 1(B) side will also be described as necessary with reference to the corresponding reference numerals. In the drawings, an arrow line indicating a wireless bearer is a dashed line, and an arrow line indicating a wired bearer or an electrical connection line is a solid line or a dot chain line.

The wireless communication unit 1(A) has a wireless base station portion 4(A) (evolved NodeB (eNodeB)) to which the UE (mobile terminal) 5 is connectable via the terminal wireless bearer 57, and an Evolved Packet Core (EPC) function portion 3(A) connected by wire to the wireless base station portion 4(A) and functions as an upper network control portion for the wireless base station portion 4(A). The EPC function portion 3(A) is connected by wire to a relay wireless communication portion 9(A) that is connectable to a wireless base station portion 4(B) (upstream wireless base station portion) of the upstream wireless communication unit 1(B) (upstream unit) via the upstream inter-unit wireless bearer 55 (upstream inter-unit wireless bearer).

On the other hand, the wireless communication unit 1(B) has the same wireless base station portion 4(B), an EPC function portion 3(B) connected by wire to the wireless base station portion 4(B) and functions as an upper network control portion for the wireless base station portion 4(B), and a relay wireless communication portion 9(B) that is connected by wire to the EPC function portion 3(B). If another wireless communication unit is disposed upstream of the wireless communication unit 1(B), the relay wireless communication portion 9(B) is connectable to a wireless base station portion of the wireless communication unit via an inter-unit wireless bearer (refer to FIG. 11). The wireless base station portion 4(B) is connectable to the relay wireless communication portion 9(A) (downstream relay wireless communication portion) of the downstream wireless communication unit 1(A) (downstream unit) via the downstream inter-unit wireless bearer 55 (downstream inter-unit wireless bearer). That is, the inter-unit wireless bearer 55 becomes an upstream inter-unit wireless bearer when viewed from the wireless communication unit 1(A), and becomes a downstream inter-unit wireless bearer when viewed from the wireless communication unit 1(B). The inter-unit wireless bearer 55 (a downstream inter-unit wireless bearer and an upstream inter-unit wireless bearer) is constructed according to the wireless protocol stack of the same method as the terminal wireless bearer 57, and in this example, the LTE wireless protocol stack.

Next, in each of the wireless communication units 1(A) and 1(B) (hereinafter, collectively a wireless communication unit 1), the EPC function portion 3 has a Mobility Management Entity (MME) 2 that serves as a gateway on a control plane side, a Serving Gateway (S-GW) 6 that serves as a gateway on a user plane side, and a Packet Data Network (PDN) Gateway (P-GW) 7 located at a node point between the EPC function portion 3 and upstream network elements (a router 8 (that will be described later) and the relay wireless communication portion 9) of the EPC function portion 3 and manages IP addresses toward the upstream network element side (that is, the upstream unit side). A plurality of UEs 5 are wirelessly connected to the wireless base station portion 4 via the terminal wireless bearers 57.

On the control plane side, the wireless base station portion (eNodeB) 4 is connected to the MME 2 via an S1-MME interface. On the user plane side, the wireless base station portion 4 is connected to the S-GW 6 via an S1-U interface. The S-GW 6 is connected to the PGW 7 via an S5 interface. On the other hand, in a general LTE network, when a plurality of wireless base stations are connected to a common core network, and a UE moves between cells of adjacent wireless base stations, handover control is performed via an X2 interface that connects the wireless base stations to each other on the control plane side or an S1 interface on the core network side. However, in this example, when the UE moves between the cells 50(A) and 50(B) of the wireless communication units 1(A) and 1(B), the wireless base station portions 4(A) and 4(B) of both the wireless communication units 1(A) and 1(B) are not connected via the X2 interface, and the EPC function portions 3(A) and 3(B) corresponding to the core network are independent of each other. Therefore, handover control in the above-described conventional form is not performed. Alternatively, a unique simple handover process is performed, which will be described in detail later.

Figure 3:
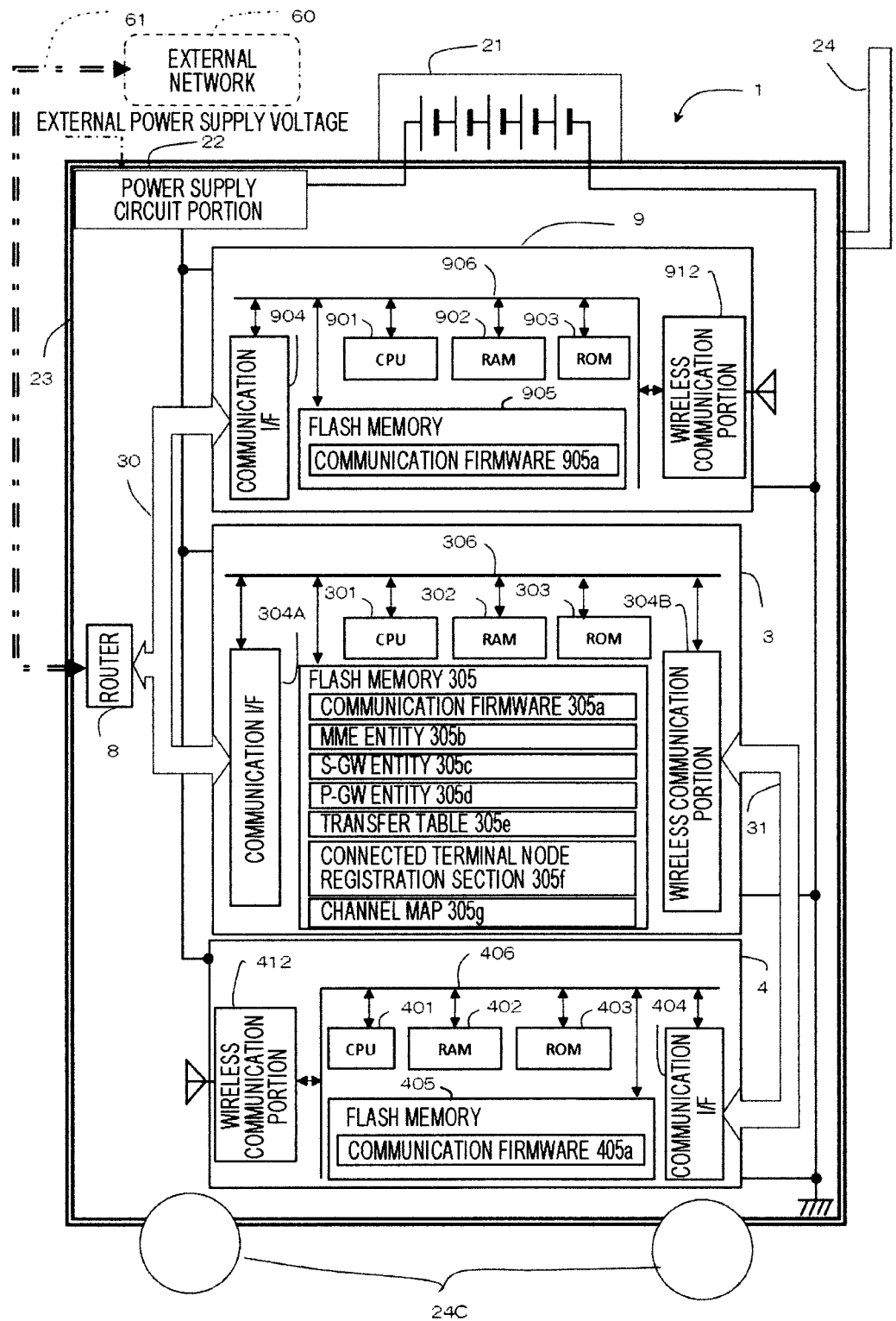
FIG. 3 is a block diagram illustrating an example of an electrical configuration of a wireless communication unit.

FIG. 3 is a block diagram illustrating an electrical configuration of the wireless communication unit 1. The EPC function portion 3 is mainly configured with microcomputer hardware, and includes a CPU 301, a RAM 302 that is a program execution area, a mask ROM 303 (that stores firmware for peripheral control of the microcomputer hardware that does not need to be rewritten permanently; the same applies hereinafter), a bus 306 connecting the above constituents to each other, and the like. A flash memory 305 is connected to the bus 306, and communication firmware 305*a* including the LTE protocol stack for EPC, and programs of an MME entity 305*b*, an S-GW entity 305*c*, and a P-GW entity 305*d* that virtually realize the respective functions of the MME 2, the S-GW 6, and the P-GW 7 in FIG. 2 with the above LTE protocol stack as a platform are installed therein. The flash memory 305 also stores a transfer table 305*e* for performing transfer routing of IP packets, a connected terminal node registration section 305*f*, and a channel map 305*g*.

An upstream communication interface 304A and a downstream communication interface 304B are connected to the bus 306. An input/output port of an IP packet for the P-GW is secured in the upstream communication interface 304A, and an input/output port of an IP packet for the S-GW is secured in the downstream communication interface 304B. In the above configuration, the MME 2, S-GW 6, and P-GW 7 illustrated in FIG. 2 are configured as virtual functional blocks on the computer hardware, but they may each be configured by and independent hardware logic.

The wireless base station portion 4 is mainly configured with microcomputer hardware, and includes a CPU 401, a RAM 402 that serves as a program execution area, a mask ROM 403, a bus 406 connecting the above constituents to each other, and the like. A flash memory 405 is connected to the bus 406, and stores communication firmware 405*a* including an LTE protocol stack for a wireless base station. The bus 406 is connected to a wireless communication portion 412 for wireless connection to a UE by constructing the terminal wireless bearer, and a communication interface 404. The communication interface 404 is connected to the downstream communication interface 304B of the EPC function portion 3 via a wired communication bus 31.

The relay wireless communication portion 9 is mainly configured with microcomputer hardware, and includes a CPU 901, a RAM 902 that serves as a program execution area, a mask ROM 903, a bus 906 connecting the above constituents to each other, and the like. A flash memory 905 is connected to the bus 906, and stores communication firmware 905*a* including an LTE protocol stack for the relay wireless communication portion. The bus 906 is connected to a communication interface 904 and a wireless communication portion 912 for wireless connection to the upstream wireless base station portion by constructing an inter-unit wireless bearer. The communication interface 904 is connected to the upstream communication interface 304A of the EPC function portion 3 via a wired communication bus 30. The LTE protocol stack to be used for the relay wireless communication portion incorporated into the communication firmware 905*a* is the same as a protocol stack for a UE (mobile terminal) that will be described later. In other words, a connection procedure of the relay wireless communication portion 9 to the upstream wireless base station portion is formally the same as the connection procedure of the UE (mobile terminal).

A router 8 that relays transmission and reception of IP packets between the EPC function portion 3 and an external network 60 such as the Internet is connected to the communication bus 30 (that is, the router 8 is provided between the EPC function portion 3 and the relay wireless communication portion 9).

Next, the wireless communication unit 1 has a structure in which a detachable secondary battery module 21 (for example, a lithium ion secondary battery module or a nickel hydrogen secondary battery module), each of the functional circuit blocks of the wireless base station portion 4, the EPC function portion 3, the router 8, and the relay wireless communication portion 9, and a power supply circuit portion 22 that converts an input voltage from the secondary battery module 21 into a drive voltage for each functional circuit block and outputs the drive voltage are integrally assembled in a portable housing 23. As a result, the wireless communication unit 1 can autonomously procure a drive power supply voltage from the secondary battery module 21, and can be used without problems even in an installation location (for example, at sea) where an external power supply voltage such as a commercial AC cannot be used. The portable housing 23 is of a box type made of metal or reinforced resin, and, in the example illustrated in FIG. 3, is provided with casters 24C on a bottom of the portable housing 23 and a manual push handle 24 on a back thereof for convenience of transportation or movement.

When an output voltage from the secondary battery module 21 drops due to discharge, the secondary battery module 21 may be detached from the portable housing 23 and attached to, for example, a commercial AC power supply (not illustrated) or a dedicated charger connected to a private power generator to be charged. The power supply circuit portion 22 can also receive an external power supply voltage such as the above commercial AC or a centralized power supply portion provided on a moving object, and can convert the external power supply voltage into a drive power supply voltage that is then output. There may be a configuration in which the secondary battery module 21 can be charged with the external power supply voltage. For example, there may be a configuration in which, when power reception is interrupted due to a power failure in a state in which the power supply circuit portion 22 is receiving power from commercial AC or the like, an operation of the wireless communication unit 1 can be continued by switching to power reception from the secondary battery module 21.

Figure 4:
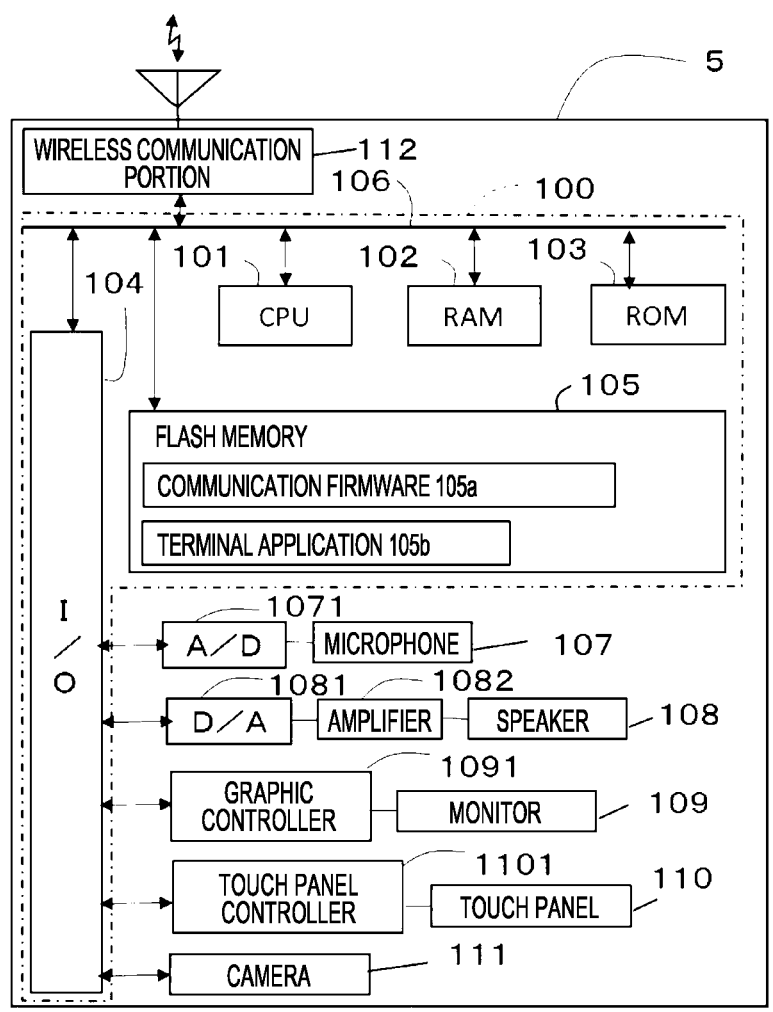
FIG. 4 is a block diagram illustrating an example of an electrical configuration of a UE (mobile terminal).

Next, FIG. 4 is a block diagram illustrating an example of an electrical configuration of the UE (mobile terminal) 5. The UE 5 is configured as a smartphone equipped with a microcomputer 100 as a processor. The microcomputer 100 includes a CPU 101, a RAM 102 that serve as a program execution area, a ROM 103, an input/output unit 104, a bus 106 connecting the above constituents to each other and the like. A flash memory 105 is connected to the bus 106, and an OS (not illustrated) for constructing an operating environment for the UE 5, a terminal application 105*b* and the like are installed therein.

A monitor 109 is connected to the input/output unit 104 via a graphic controller 1091. Various pieces of information required to control an operation of the UE 5 are input to the monitor 109 in cooperation with various software operation portions (buttons, icons and the like, see FIGS. 13 to 17) that are displayed and formed on the monitor 109 by overlapping a touch panel 110 forming an input portion. The touch panel 110 is connected to the input/output unit 104 via a touch panel controller 1101. A camera 111 that captures a still image or a moving image is connected to the input/output unit 104. A wireless communication portion 112 is connected to the bus 106. The UE 5 is wirelessly connected by the wireless communication portion 112 to the wireless base station portion 4 of the wireless communication unit 1 in FIG. 2 via the terminal wireless bearer 57.

Figure 5:
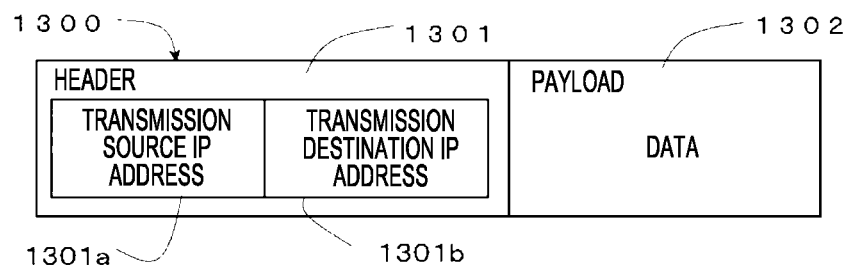
FIG. 5 is a conceptual diagram of an IP packet.

FIG. 5 is a schematic diagram illustrating a structure of an IP packet used for data transfer between the UE 5 and the wireless communication unit 1. An IP packet 1300 includes an IP header 1301 and a payload 1302, and a PDU identification number, a data transmission source address 1301*a*, a transmission destination address 1301*b*, and the like are written in the IP header 1301.

Figure 6:
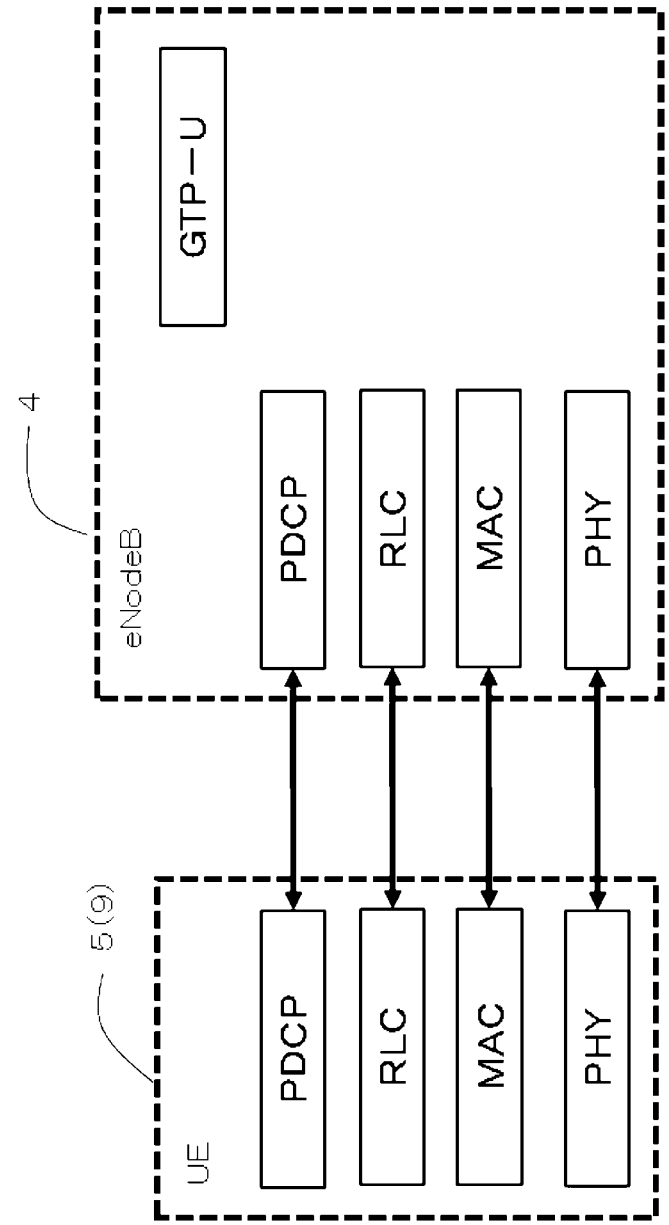
FIG. 6 is a diagram conceptually illustrating a protocol stack of a 3GPP control plane.
Figure 7:
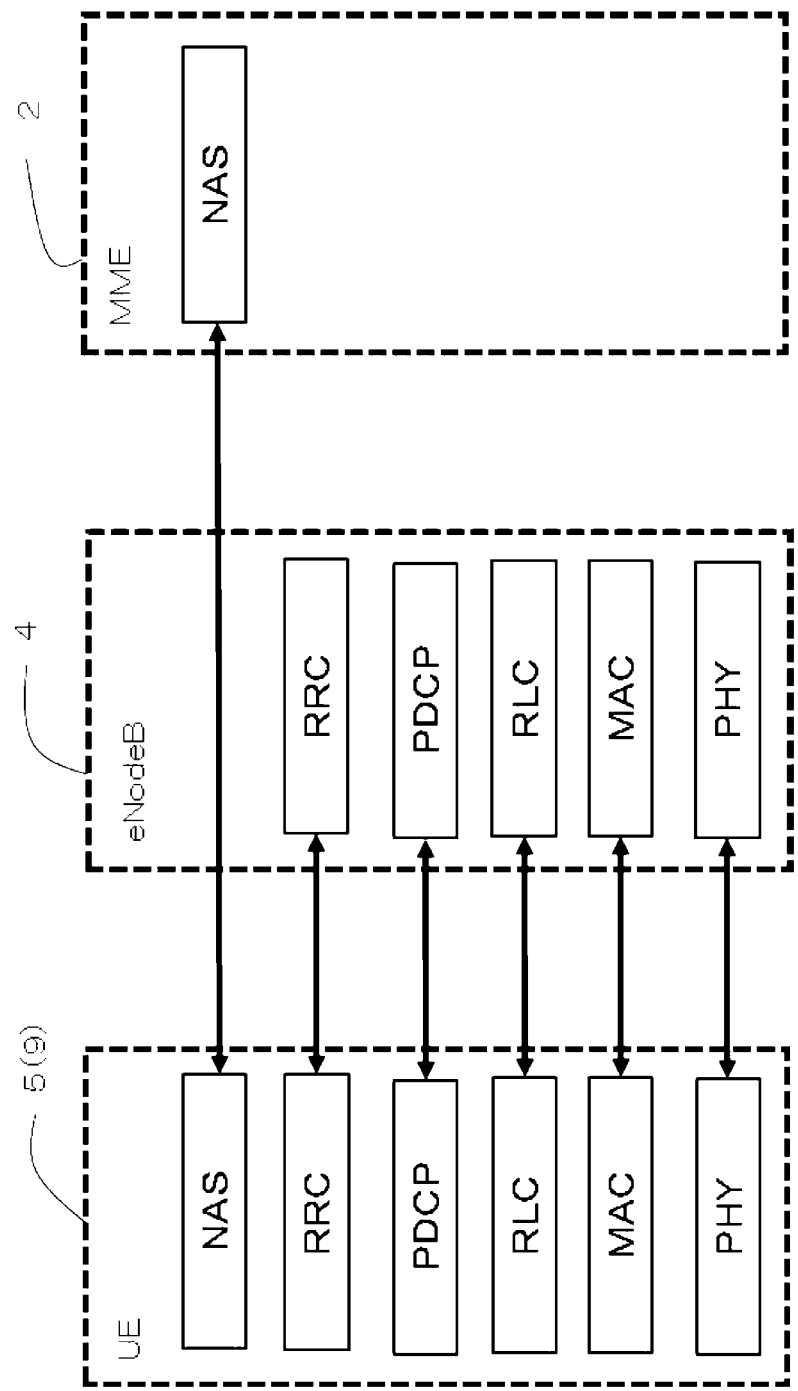
FIG. 7 is a diagram conceptually illustrating a protocol stack of a 3GPP user plane.

FIGS. 6 and 7 illustrate a wireless protocol stack in the LTE system, FIG. 6 illustrates a protocol stack of the user plane, and FIG. 7 illustrates a protocol stack of the control plane. The wireless protocol stack is divided into layers 1 to 3 of an OSI reference model, and the layer 1 is a physical (PHY) layer. The layer 2 includes a Medium Access Control (MAC) layer, a Radio Link Control (RLC) layer, and a Packet Data Convergence Protocol (PDCP: packet data encryption) layer. The layer 3 includes a Radio Resource Control (RRC) layer and a NonAccess Stratum (NAS) layer.

A function of each layer is as follows:

PHY layer: This PHY layer performs encoding/decoding, modulation/demodulation, antenna mapping/demapping, and resource mapping/demapping. Data and control signals are transferred between PHY layers of the UE 5 and the relay wireless communication portion 9 and a PHY layers of the wireless base station portion (eNodeB) 4 via a physical channel.

MAC layer: This MAC layer performs data priority control, a retransmission control process using HARQ, a random access procedure, and the like. Data and control signals are transferred between MAC layers of the UE 5 and the relay wireless communication portion 9 and a MAC layer of the wireless base station portion 4 via a transport channel. The MAC layer of the wireless base station portion 4 includes a transport format (a transport block size and a modulation and coding scheme (MCS)) of uplink and downlink and a scheduler that determines a resource block allocated to the UE 5.

RLC layer: This layer transfers data to an RLC layer on a reception side by utilizing the functions of the MAC layer and the PHY layer. Data and control signals are transferred between the RLC layer of the UE 5 and the RLC layer of the wireless base station portion 4 via a logical channel.

PDCP layer: This layer performs compression/decompression and encryption/decryption of a header of the PDU.

RRC layer: This layer is defined only in the control plane that handles a control signal. Messages for various settings (RRC messages) are transferred between RRC layers of the UE 5 and an RRC layer of the wireless base station portion 4. The RRC layer controls logical channels, transport channels, and physical channels according to establishment, re-establishment, and release of wireless bearers. When there is a connection (RRC connection) between the RRC of the UE 5 and the RRC of the wireless base station portion 4, the UE 5 is in an RRC connected mode, and, in other examples, it is in an RRC idle mode.

The above layers are used in both the control plane and the user plane. On the other hand, only for the control plane, the UE 5, the relay wireless communication portion 9, and the MME 2 are provided with a NAS layer that performs session management, mobility management and the like as an upper layer of the RRC layer. A General Packet Radio Service (GPRS) Tunneling Protocol for User Plane (GTP-U) layer is provided at a user data transfer interface with the EPC function portion 3 side of the wireless base station portion 4. The GTP-U layer is used to identify the UE 5 or the relay wireless communication portion 9 that is a connection destination or a wireless bearer to be used.

Figure 8:
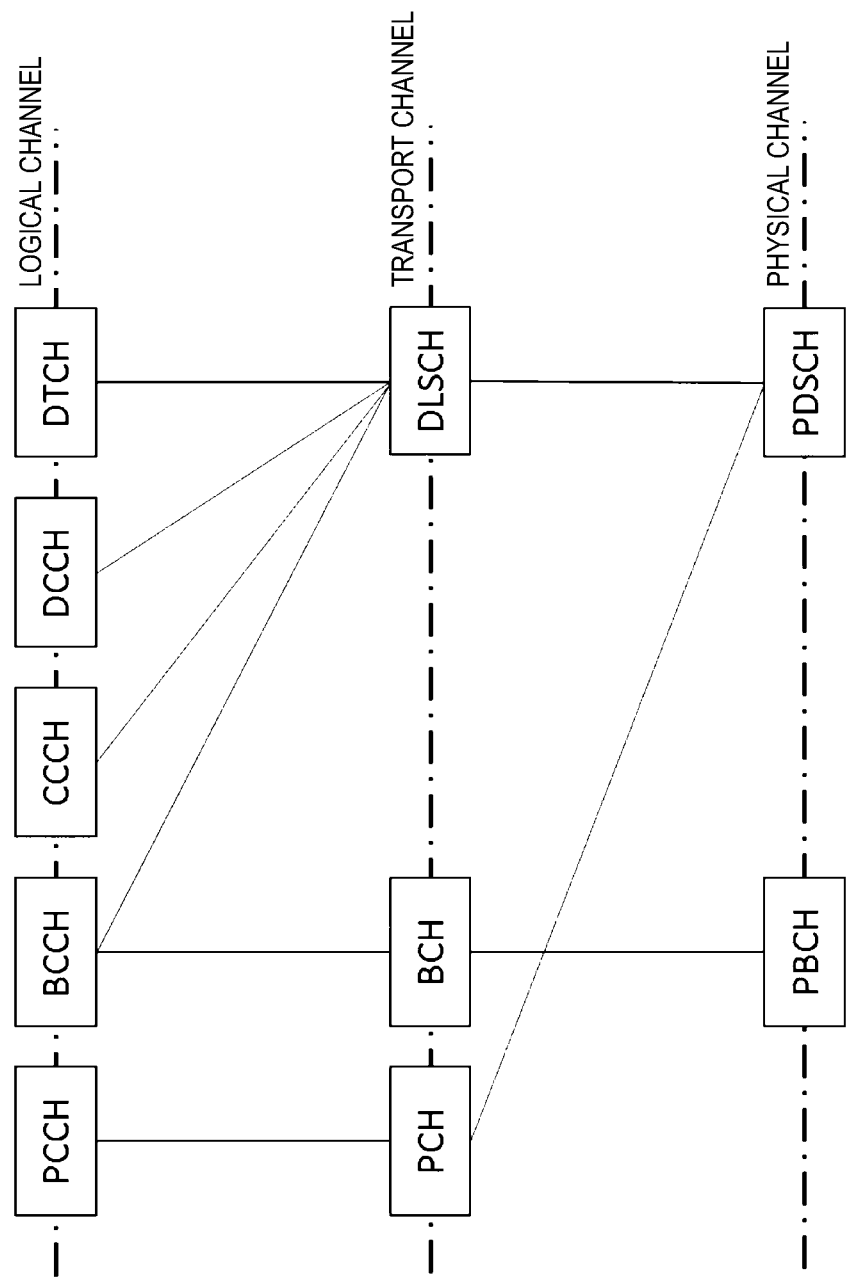
FIG. 8 is a diagram conceptually illustrating downlink channel mapping of 3GPP.

Next, FIG. 8 illustrates downlink channel mapping in the LTE system. A mapping relationship between a logical channel (downlink logical channel), a transport channel (downlink transport channel), and a physical channel (downlink physical channel) is illustrated. Hereinafter, the channels will be described in order:

Dedicated traffic channel (DTCH): This channel is an individual logical channel that transmits data. The DTCH is mapped to a downlink shared channel (DLSCH) that is a transport channel.

Dedicated control channel (DCCH): This channel is a logical channel that transmits individual control information between the UE 5 and the network. The DCCH is used when the UE 5 and the relay wireless communication portion 9 have an RRC connection with the wireless base station portion 4. The DCCH is mapped to the DLSCH.

Common control channel (CCCH): This channel is a logical channel for transmission control information between the UE 5 and the relay wireless communication portion 9, and the wireless base station portion 4. The CCCH is used when the UE 5 and the relay wireless communication portion 9 do not have an RRC connection with the wireless base station portion 4. The CCCH is mapped to the DLSCH.

Broadcast control channel (BCCH): This channel is a logical channel for system information distribution. The BCCH is mapped to a broadcast channel (BCH) that is a transport channel or the DLSCH.

Paging control channel (PCCH): This channel is a logical channel to report changes in paging information and system information. The PCCH is mapped to a paging channel (PCH) that is a transport channel.

A mapping relationship between the transport channel and the physical channel is as follows:

DLSCH and PCH: these channels are mapped to a physical downlink shared channel (PDSCH). The DLSCH supports HARQ, link adaptation, and dynamic resource allocation.

BCH: This channel is mapped to a physical broadcast channel (PBCH).

Figure 9:
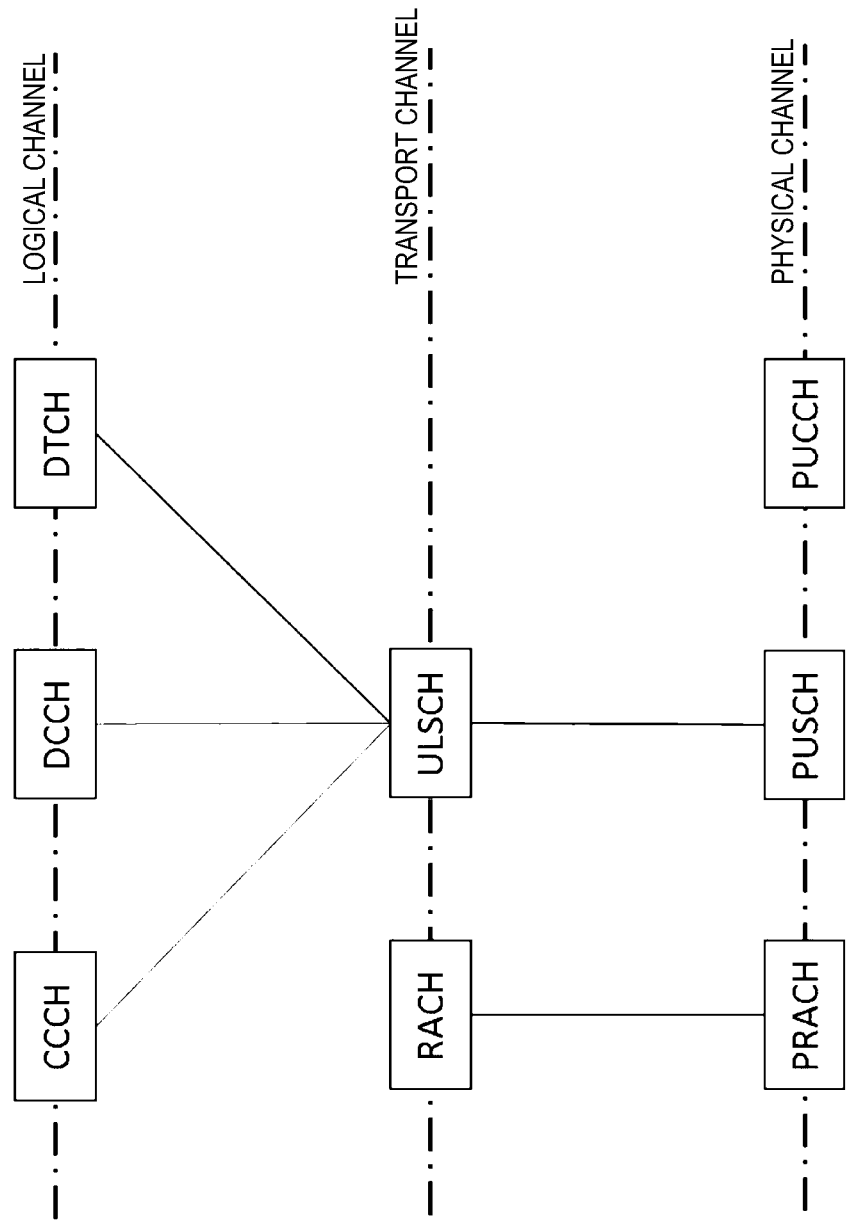
FIG. 9 is a diagram conceptually illustrating similar uplink channel mapping.

Next, FIG. 9 illustrates uplink channel mapping in the LTE system. Similar to FIG. 8, a mapping relationship between a logical channel (downlink logical channel), a transport channel (downlink transport channel), and a physical channel (downlink physical channel) is illustrated. Hereinafter, the channels will be described in order:

Common Control Channel (CCCH): This channel is a logical channel used to transmits control information between the UE 5 and the relay wireless communication portion 9, and the EPC function portion 3, and is used by the UE 5 that does not have a Radio Resource Control (RRC) connection with the EPC function portion 3.

Dedicated control channel (DCCH): This channel is a one-to-one (point-to-point) bidirectional logical channel, and is a channel used to transmit individual control information between the UE 5 and relay wireless communication portion 9, and the EPC function portion 3. The dedicated control channel DCCH is used by the UE 5 that has an RRC connection.

Dedicated traffic channel (DTCH): This channel is a one-to-one bidirectional logical channel, and is a channel dedicated to a specific UE or relay wireless communication portion, and is used for transferring user information.

Uplink shared channel (ULSCH): This channel is a transport channel that supports HARQ, dynamic adaptive wireless link control, and discontinuous transmission (DTX).

Random access channel (RACH): This channel is a transport channel used to transmit restricted control information.

Physical uplink control channel (PUCCH): This channel is used to notify the wireless base station portion 4 of response information for downlink data (acknowledge (ACK)/negative acknowledgment (NACK)), downlink wireless quality information, and an uplink data transmission request (scheduling request: SR).

Physical uplink shared channel (PUSCH): This channel is a physical channel used to transmit uplink data.

Physical random access channel (PRACH): This channel is a physical channel mainly used for random access preamble transmission to acquire transmission timing information (transmission timing command) from the UE 5 to the wireless base station portion 4. The random access preamble transmission is performed in a random access procedure.

As illustrated in FIG. 9, in the uplink, the transport channel and the physical channel are mapped as follows. The uplink shared channel ULSCH is mapped to the physical uplink shared channel PUSCH. The random access channel RACH is mapped to the physical random access channel PRACH. The physical uplink control channel PUCCH is used by the physical channel alone. The common control channel CCCH, the dedicated control channel DCCH, and the dedicated traffic channel DTCH are mapped to the uplink shared channel ULSCH.

Next, in the downlink of the LTE system, the UE 5 and the relay wireless communication portion 9 is wirelessly connected to the wireless base station portion 4 by Orthogonal Frequency-Division Multiplexing (OFDM) access (OFDMA). The OFDMA method is characterized as a two-dimensional multiplexed access method in which frequency division multiplexing and time division multiplexing are combined. Specifically, subcarriers on a frequency axis and a time axis that are orthogonal to each other are divided and allocated to the UE 5, and orthogonal subcarriers on the frequency axis are divided such that a signal of each subcarrier becomes zero (0 points). By dividing the subcarriers and allocating the subcarriers on the frequency axis, another subcarrier that is not influenced by fading can be selected even if a certain subcarrier is influenced by fading. Therefore, there is an advantage that a user can use a more favorable subcarrier depending on a wireless environment and thus the wireless quality can be maintained.

Figure 10:
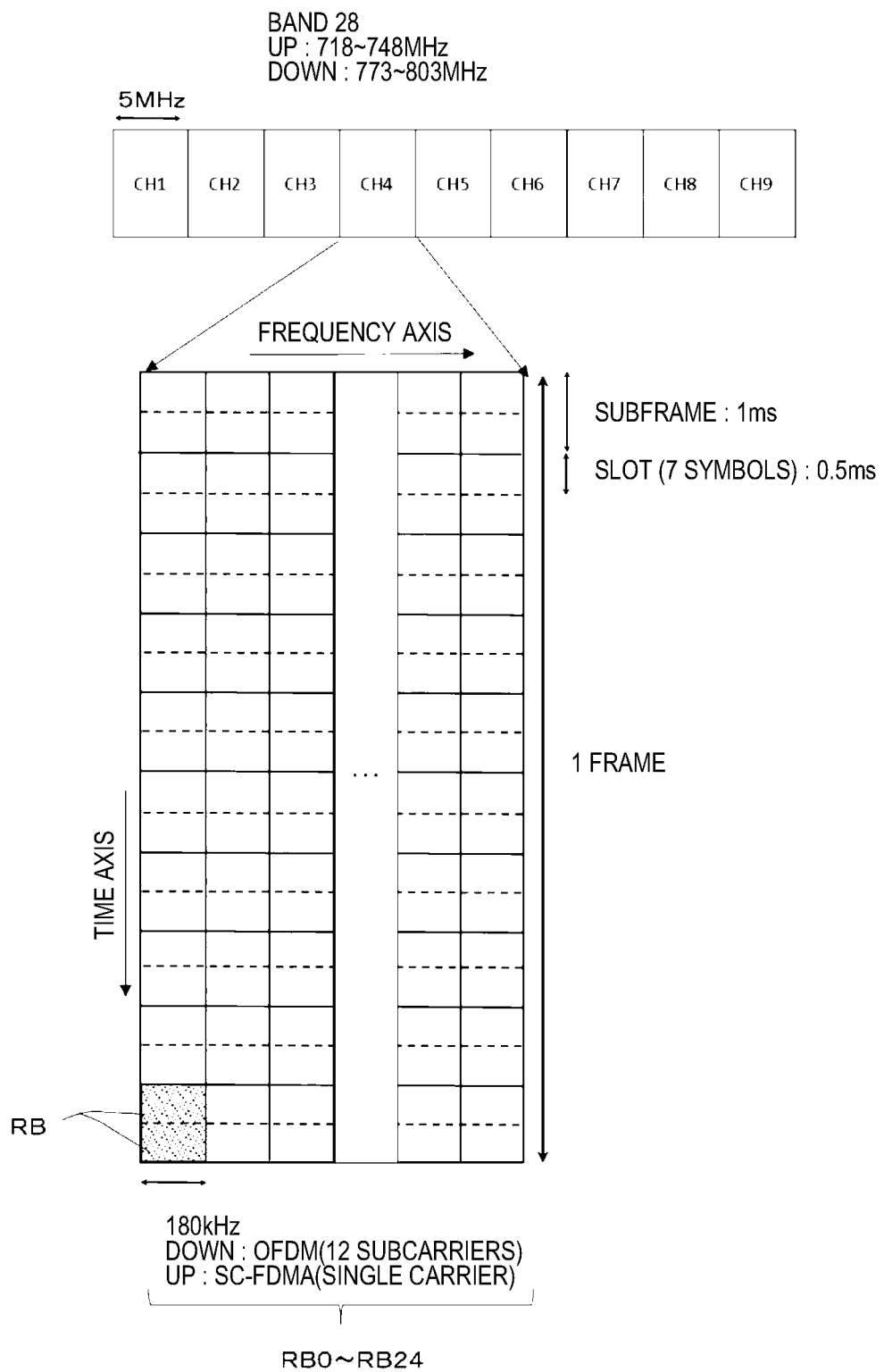
FIG. 10 is a conceptual diagram illustrating a relationship between a frequency band channel and a resource block.

In the OFDMA method, a resource block (hereinafter, also an RB) defined on a virtual plane where the frequency axis and the time axis are stretched is employed as a wireless resource. As illustrated in FIG. 10, an RB is defined as a block in which the above plane is divided into a matrix at 180 kHz/0.5 msec, and each block has twelve adjacent subcarriers at 15 kHz intervals on the frequency axis and one slot (seven symbols) of a frame on the time axis. This RB is allocated to the UE 5 and the relay wireless communication portion 9 as a set of two adjacent blocks (1 msec) on the time axis. On the other hand, in the uplink of the LTE system, a resource block of the same concept is used as a wireless resource except that Single Career FrequencyDivision Multiplexing (SC-FDM) access (SC-FDMA) is employed. In OFDMA, one resource block is divided into twelve subcarriers (bandwidth: 15 kHz) on the frequency axis, whereas SC-FDMA is a single carrier method in which division into subcarriers is not performed.

In this example, as illustrated in FIG. 2, the number of (adjacent) wireless base station portions 4 capable of constructing the (upstream) inter-unit wireless bearer 55 is set to only one for the relay wireless communication portion 9 of each wireless communication unit 1. In principle, it is possible to set a plurality of (adjacent) wireless base station portions 4 capable of constructing the inter-unit wireless bearer 55, but in this example, in a cell in which the interconnected wireless communication units 1 overlap each other, the number of frequency channels allocated to the inter-unit wireless bearer increases. As a result, the number of frequency channels that can be used by the UE 5 conversely decreases, and thus problems such as congestion are likely to occur. There is a problem in that the connection topology between the wireless communication units 1 becomes complicated and a path control process for IP packet transfer becomes extremely complicated. Such a problem can be solved by restricting the number of (adjacent) wireless base station portions 4 capable of constructing the (upstream) inter-unit wireless bearer 55 to only one.

Figure 11:
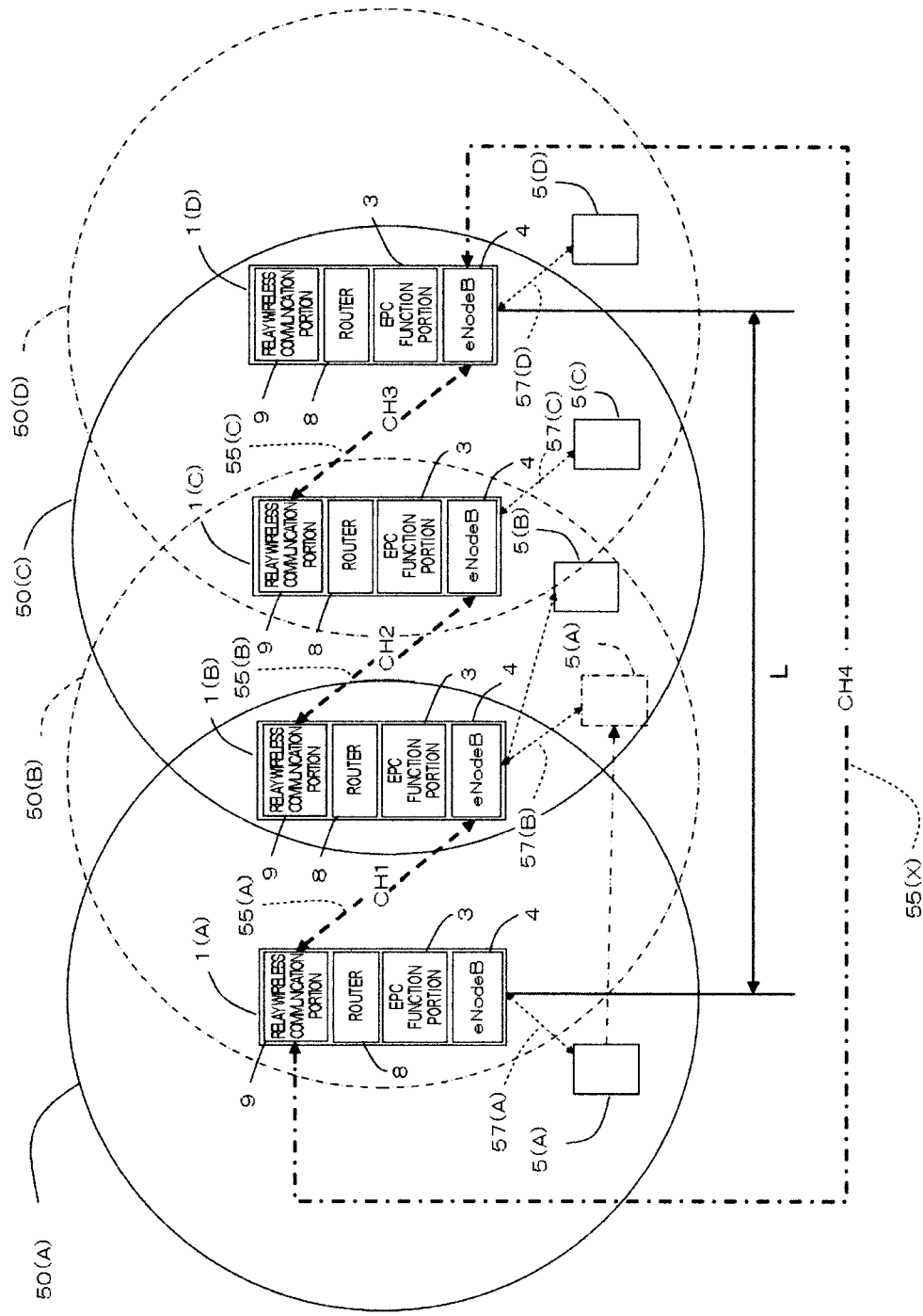
FIG. 11 is a diagram schematically illustrating an example of a configuration form of the wireless network system.

FIG. 11 illustrates a configuration example of the wireless network system when the wireless communication unit 1 having the above configuration is employed. In the wireless network system, the group of the wireless communication units 1(A) to 1(D) are sequentially connected by inter-unit wireless bearers 55(A), 55(B), and 55(C) with a positional relationship in which base station cells (50(A) and 50(B), 50(B) and 50(C), and 50(C) and 50(D)) of wireless communication unit pairs (1(A) and 1(B), 1(B) and 1(C), and 1(C) and 1(D)) adjacent to each other partially overlap each other. With this configuration, it can be easily understood that the connection topology between the wireless communication units 1 is extremely simplified. In this example, the UE 5(A) (mobile terminal) connected to one of the pair of wireless communication units 1(A) and 1(B) and the UE 5(B) (mobile terminal) connected to the other wireless communication unit can perform transmission and reception of IP packets via the pair of wireless communication units 1(A) and 1(B) and the inter-unit wireless bearer 55(A) connecting the pair of wireless communication units 1(A) and 1(B). All of the group of the wireless communication units 1(A) to 1(D) may be mounted on the above moving object such as a ship or a vehicle, or only some of them may be mounted on the moving object and the remaining wireless communication units may be fixedly installed in a building or the like.

In FIG. 11, the number of wireless communication units sequentially connected by the inter-unit wireless bearers 55(A), 55(B), and 55(C) is three or more (four in FIG. 11). In this example, the UE (mobile terminal) 5(A) connected to the first wireless communication unit 1(A) forming one wireless communication unit of the group of the wireless communication units 1(A) to 1(D) and the UEs (mobile terminals) 5(C) and 5(D) connected to the second wireless communication units 1(C) and 1(D) disposed across one or more intermediate wireless communication units 1(B) and 1(C) with respect to the first wireless communication unit 1(A) in the group of the wireless communication units 1(A) to 1(D) can perform transmission and reception of IP packets via the first wireless communication unit 1(A), the intermediate wireless communication units 1(B) and 1(C), the second wireless communication units 1(C) and 1(D), and the inter-unit wireless bearers 55(A), 55(B), and 55(C) that connect the wireless communication units 1(A) to 1(D) to each other. As described above, the number of sequentially connected wireless communication units can be easily increased, and thus IP packets can be transmitted and received through wireless communication between UEs 5 in a wider area.

In the 3GPP specification wireless communication method, any of a plurality of frequency bands defined in the 3GPP is allocated. The allocated frequency band differs depending on a communication method. For example, bands 1, 3, 6, 8, 11, 18, 19, 21, 26, 28, 41, and 42 are used as LTE bands. Each band is divided into a plurality of frequency channels having a predetermined bandwidth, and the EPC function portion 3 selects a predetermined frequency channel and constructs the inter-unit wireless bearer 55 and the terminal wireless bearer 57 in FIG. 2. That is, a downstream inter-unit channel, an upstream inter-unit channel, and a terminal side channel are each set as a frequency channel belonging to any of a plurality of bands defined in 3GPP.

In this example, the EPC function portion 3 fixedly sets a set frequency channel of the (downstream) inter-unit wireless bearer 55 to a (downstream) inter-unit channel that is a specific predetermined frequency channel. The terminal side channel that is a set frequency channel of the terminal wireless bearer 57 is set to the same frequency channel as the (downstream) inter-unit channel. That is, the EPC function portion 3 sets the same frequency channel as that of the relay wireless communication portion 9 of the downstream wireless communication unit 1 and the mobile terminal 5 for the wireless base station portion 4 directly underneath.

The terminal wireless bearer 57 is required to appropriately change the number of frequency channels used in the same band according to the number of UEs 5 connected to the wireless base station portion 4 and a congestion status of communication traffic due to a capacity of transferred data. When a UE moves between cells in which adjacent wireless communication units overlap each other, if the same frequency channel is used by the terminal wireless bearer 57 when the UE is connected to each wireless base station portion in a cell before the movement and a cell after the movement, a problem of cell-to-cell interference occurs. Therefore, when the UE (mobile terminal) 5 moves to a downstream cell, a handover process that will be described later is performed in a form in which the wireless base station portion 4 of the wireless communication unit 1 of the movement destination cell switches to a set frequency channel ((downstream) inter-unit channel) of the (downstream) inter-unit wireless bearer 55 seen from the wireless base station portion 4. On the other hand, when the UE (mobile terminal) 5 moves to an upstream cell, a handover process that will be described later is performed in a form in which the wireless base station portion 4 of the wireless communication unit 1 of the movement destination cell switches to a set frequency channel ((upstream) inter-unit channel) of the (upstream) inter-unit wireless bearer 55 seen from the wireless base station portion 4. That is, as the UE (mobile terminal) 5 moves between cells, the terminal wireless bearer 57 is constructed by sequentially switching between terminal side channels. However, regarding the inter-unit wireless bearer 55, the transfer of IP packets from each communication unit 1 to which a plurality of UEs 5 are connected is aggregated and an amount of communication traffic becomes very large, and thus an IP packet transfer process is required to be performed as smooth as possible. In this example, if a situation occurs in which a frequency channel setting of the inter-unit wireless bearer 55 is frequently changed according to a connection status of the UE 5 in each cell, when IP packet transfer across the plurality of wireless communication units 1 is performed, problems such as communication interruption in the inter-unit wireless bearer 55 are likely to occur.

However, in the configuration of the wireless network system in which a plurality of wireless communication units 1(A) to 1(D) are sequentially connected as illustrated in FIG. 11, unless the connection topology with the wireless base station portion 4 of an adjacent unit changes significantly due to the inter-unit wireless bearer 55, the wireless base station portion 4 that is a connection destination of the relay wireless communication portion 9 of each wireless communication unit 1 is fixed, and thus a handover process involving frequency channel switching for the relay wireless communication portion 9 is unnecessary. Therefore, by fixedly setting the inter-unit wireless bearer 55 to an inter-unit channel that is one specific frequency channel defined in advance, it is possible to effectively prevent communication interruption due to channel switching of the inter-unit wireless bearer 55 and thus to significantly improve the stability of IP packet transfer when crossing a plurality of wireless communication units 1.

Next, in FIG. 11, the cell 50(A) of the wireless communication unit 1(A), the cell 50(B) of the wireless communication unit 1(B), and the cell 50(C) of the wireless communication unit 1(C) overlap each other. In this example, inter-unit channels of the inter-unit wireless bearers 55(A) and (B) connecting the upstream and downstream wireless communication units 1(A) and 1(C) when viewed from the wireless communication unit 1(B) are set to different frequency channels, and thus it is possible to effectively prevent radio wave interference between the plurality of cells 50(A) to 50(C) that partially overlap each other and are involved in construction of the inter-unit wireless bearers 55(A) and (B).

More specifically, each EPC function portion 3 of the wireless communication units 1(A) to 1(D) sets a downstream inter-unit channel to a frequency channel different from an upstream inter-unit channel set for an upstream inter-unit wireless bearer when the (upstream) inter-unit wireless bearer is constructed, and sets a frequency channel group different from both the downstream inter-unit channel and the upstream inter-unit channel as a terminal channel group. For example, when focusing on the wireless communication unit 1(B), the EPC function portion 3 of the wireless communication unit 1(B) sets the upstream inter-unit channel set for the inter-unit wireless bearer 55(B) to, for example, CH2. On the other hand, the EPC function portion 3 of the wireless communication unit 1(A) sets the upstream inter-unit channel (which is a downstream inter-unit channel when seen from the wireless communication unit 1(B)) set for the inter-unit wireless bearers 55(A) (which is a downstream inter-unit wireless bearer when seen from the wireless communication unit 1(B)) when seen from the wireless communication unit 1(A), to CH1 that is different from CH2. In this example, by setting the downstream inter-unit channel CH1 and the upstream inter-unit channel CH2 as different frequency channels in the same band, there is an advantage that hardware of the wireless base station portion 4 and the relay wireless communication portion 9 for constructing the inter-unit wireless bearer can be easily configured with a single band specification.

The terminal side channel is set to the same channel as the downstream inter-unit channel among the frequency channels belonging to the same band. For example, when only one band is allocated to the entire wireless network system in FIG. 11, the terminal side channel is set to the same channel as the downstream inter-unit channel among the frequency channels belonging to the same band. Therefore, hardware of the wireless base station portion 4 and the relay wireless communication portion 9 can be configured with a single band specification including construction of a terminal wireless bearer, which contributes to simplification of a device configuration. The terminal side channel may be switchably selected from remaining frequency channels other than those set as the downstream inter-unit channel and the upstream inter-unit channel.

In this example, in the line of the plurality of wireless communication units 1 that are sequentially connected as illustrated in FIG. 11, with respect to the plurality of wireless communication units 1(A) to 1(D) of which connection path lengths are within a limit distance L defined to not cause overlap between cells, it is desirable to set all inter-unit channels of the inter-unit wireless bearers 55(A) to 55(C) connecting them to different frequency channels. On the other hand, when another wireless communication unit is further connected upstream or downstream of the wireless communication units 1(A) to 1(D) of which the connection path length is within the limit distance L, an inter-unit channel of an inter-unit wireless bearer connecting the other wireless communication unit may also be set to the same frequency channel as any of the inter-unit channels allocated to the wireless communication units within the limit distance L. For example, in FIG. 11, when a new wireless communication unit is connected further upstream of the wireless communication unit 1(A), the same frequency channel CH1 as the upstream inter-unit channel of the wireless communication unit 1(A) farthest from the new wireless communication unit may be set as a downstream inter-unit channel of the new wireless communication unit.

In this example, the band 28 defined in 3GPP is employed as the same band as described above. The band 28 is set in the VHF band (700 MHz band), which has become vacant due to the suspension of terrestrial analog television broadcasting. Since the band 28 is a low frequency band, a communication speed is somewhat slow, so adoption in areas with many terminal subscribers such as urban areas is not being actively promoted, and the usage of radio wave resources is not poor, and thus smooth connection can be expected. The low frequency band means that radio waves have excellent distant reachability, and an area (cell) that can be covered by one wireless communication unit can be expanded. The low frequency band has the property of being easily connected even if there are underground or obstacles, and it is also suitable for constructing the wireless network system at sea or in a mine, for example.

Next, in the wireless network system, as illustrated in FIG. 11, as a specific method of setting inter-unit channels of the adjacent inter-unit wireless bearers 55(A) to 55(C) to be different from each other, for example, this may be performed by the respective wireless communication units 1(A) to 1(D) sharing inter-unit channel information via the inter-wireless bearers 55(A) to 55(C).

When an upper limit of the number of wireless communication units participating in the wireless network system is defined, it is effective to, depending on a combination of node addresses assigned to the individual wireless communication units 1(A) to 1(D) in FIG. 11, uniformly determine the types of inter-unit channels to be allocated in the form of a channel map and to incorporate this channel map into the EPC function portion 3 of each wireless communication unit to further simplify the process. Even if each EPC function portion 3 does not share channel setting information with the EPC function portion 3 of another wireless communication unit, it is possible to set inter-unit channels of adjacent inter-unit wireless bearers to be different by referring to the incorporated channel map. In this example, the EPC function portion 1 has a channel map storage section that stores a channel map indicating a correspondence between a frequency channel group that can be selected as a downstream inter-unit channel and a node address of a downstream relay wireless communication portion that is a connection destination, and is operated to, in response to an attachment request from the downstream relay wireless communication portion, acquire unit identification information of the downstream relay wireless communication portion, specify a frequency channel corresponding to the acquired node address on the channel map, and set the specified frequency channel as a downstream inter-unit channel.

Figure 12:
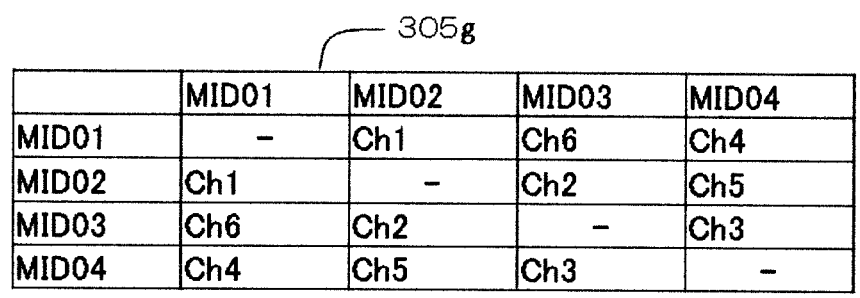
FIG. 12 is a conceptual diagram of a channel map.

FIG. 12 illustrates an example of a channel map 305g. In the channel map 305g, the number of wireless communication units 1 participating in the system construction is four, and unit identification information MID01 to MID04 are assigned thereto. Channel numbers of inter-unit channels set between the corresponding wireless communication units are defined not to be duplicated according to a combination of the unit identification information. The unit identification information may be authentication information IMSI (International Mobile Subscriber Identity) of the wireless communication unit 1 or may be a node address. The IMSI is transmitted by using the PUSCH.

Figure 13:
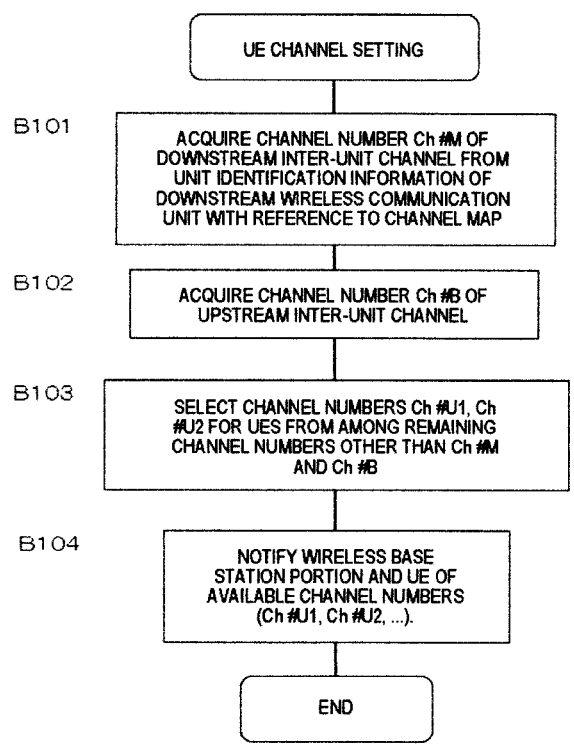
FIG. 13 is a flowchart illustrating a flow of a channel setting process for the UE.

FIG. 13 is a flowchart illustrating a flow of a channel setting process using the channel map 305g, performed by the EPC function portion 3. In B101, a channel number Ch #M of a downstream inter-unit channel is acquired from the unit identification information (IMSI) of the downstream wireless communication unit with reference to the channel map 305g. In B102, a channel number Ch #B of an upstream inter-unit channel (the channel number Ch #B may be plural) is acquired from the upstream wireless communication unit. In B103, channel numbers Ch #U1, Ch #U2, and the like for the UEs are selected from among the remaining channel numbers other than Ch #M and Ch #B. In B104, the wireless base station portion and the UEs are notified of the available channel numbers (Ch #U1, Ch #U2, . . . ). This notification is executed in an attachment sequence of the wireless base station portion and the UEs.

Figure 14:
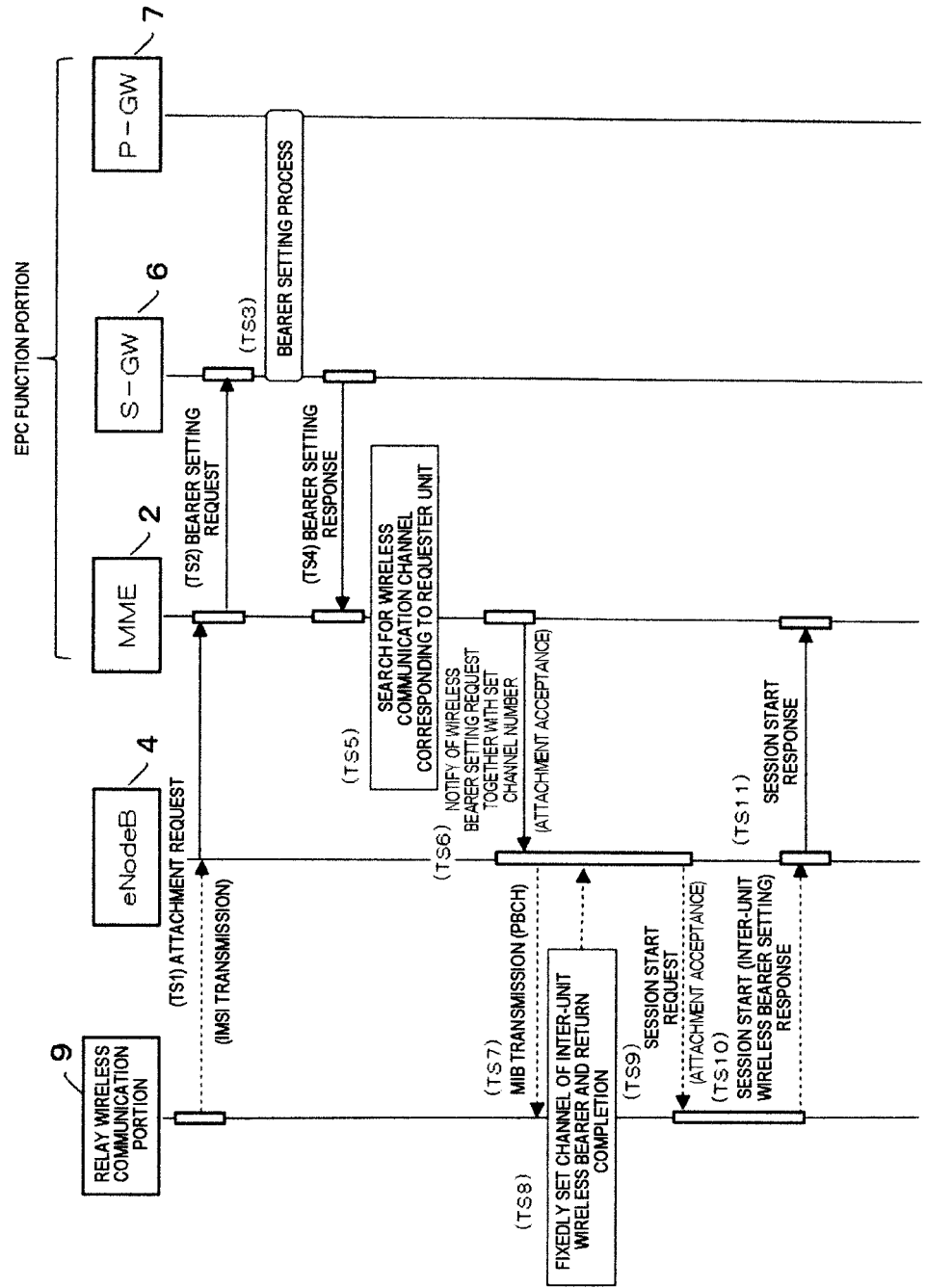
FIG. 14 is a communication flow diagram illustrating an attachment sequence of a relay wireless communication portion of the wireless communication unit to another upstream wireless communication unit.

Hereinafter, a flow of an attachment sequence in the relay wireless communication portion 9 and the UE 5 will be described with reference to FIGS. 14 and 15. FIG. 14 illustrates an attachment sequence in the relay wireless communication portion 9. In TS1, an attachment request is issued from the relay wireless communication portion 9 to the MME 2 via the wireless base station portion (eNodeB) 4. In this example, an IP address of the wireless communication unit is transmitted to the requester. In response, the MME 2 transmits a bearer setting request to the S-GW 6 in TS2. The S-GW 6 executes the bearer setting process of the physical line on the S5 interface with the P-GW 7 on the TS3. If the bearer is set, the S-GW 6 transmits a bearer setting response to the MME 2 in TS4.

In TS5, the MME 2 searches for a wireless communication channel corresponding to the IP address of the requester unit on the channel map 305g (FIG. 12). In TS6, the wireless base station portion 4 is notified of a wireless bearer setting request (attachment acceptance) together with the set channel number. In response, the wireless base station portion 4 transmits a master information block (MIB) including the set channel number of the wireless bearer (inter-unit wireless bearer) to be set in TS7 to the relay wireless communication portion 9.

In TS8, the relay wireless communication portion 9 fixedly sets the inter-unit channel to the set channel number included in the received MIB, and returns setting completion. In response, the wireless base station portion 4 notifies the relay wireless communication portion 9 of a session start request (attachment acceptance) in TS9. In TS10, the relay wireless communication portion 9 sets an inter-unit wireless bearer and returns a session start response to the wireless base station portion 4. In TS11, the wireless base station portion 4 notifies the MME 2 of a session start response.

Figure 15:
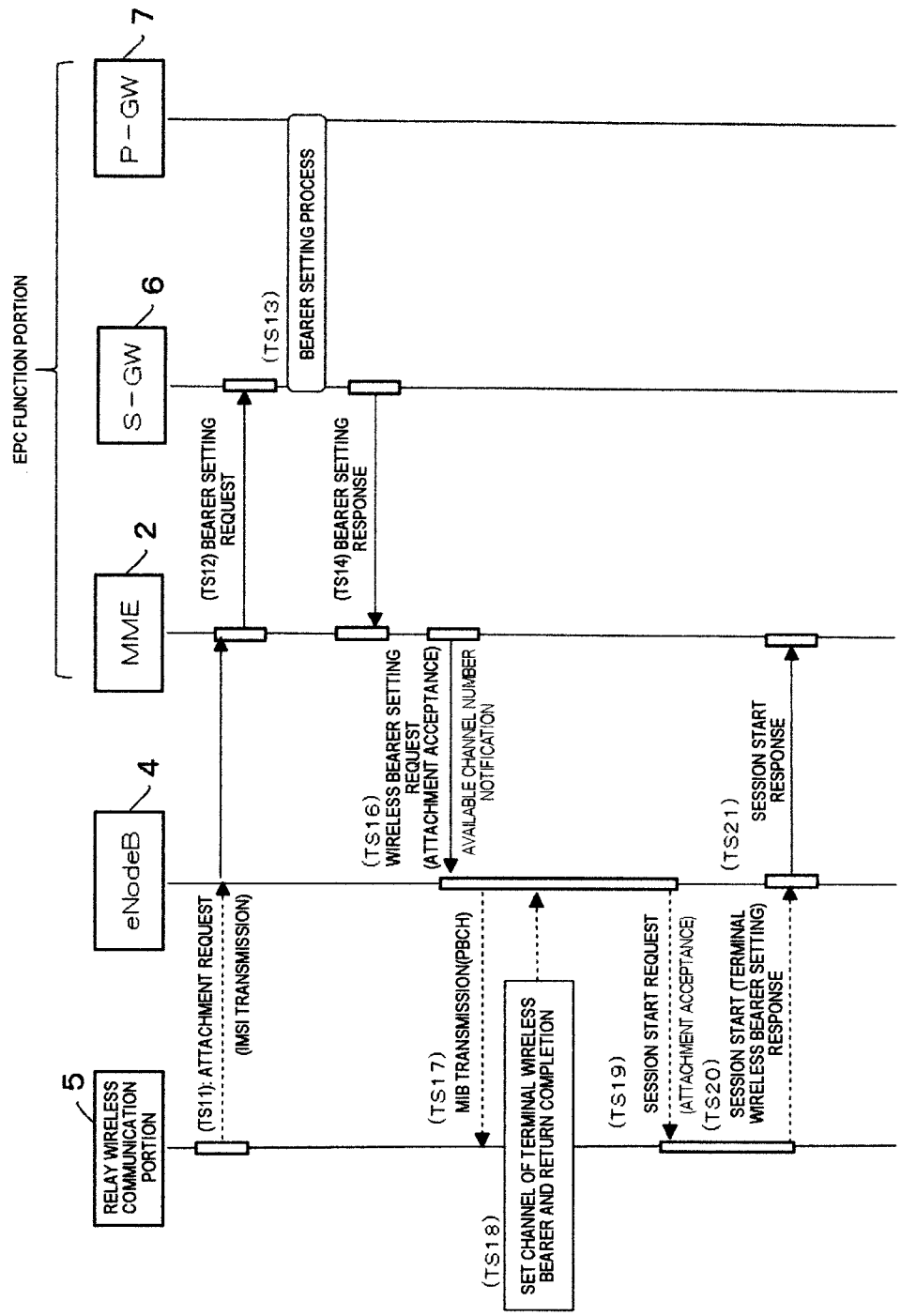
FIG. 15 is a communication flow diagram illustrating an attachment sequence of the UE (mobile terminal) to a wireless communication unit.

On the other hand, FIG. 15 illustrates an attachment sequence in the UE 5 (mobile terminal). In TS11', an attachment request is issued from the UE 5 to the MME 2 via the wireless base station portion (eNodeB) 4 (in this example, the above IMSI is transmitted as authentication information). In response, the MME 2 transmits a bearer setting request to the SGW 6 in TS12. The S-GW 6 executes a bearer setting process for a physical line on the S5 interface with the P-GW 7 in TS13. If the bearer is set, the S-GW 6 transmits a bearer setting response to the MME 2 in TS14.

The MME 2 determines set channel numbers that can be used for a terminal wireless bearer group according to the process in FIG. 13. In TS16, the wireless base station portion 4 is notified of a wireless bearer setting request (attachment acceptance) together with the determined set channel numbers. In response, the wireless base station portion 4 transmits a master information block (MIB) including a set channel number of a wireless bearer (inter-unit wireless bearer) to be set in TS17 to the UE 5.

In TS18, the UE 5 sets a terminal side channel to the set channel number included in the received MIB, and returns setting completion. In response, the wireless base station portion 4 notifies the UE 5 of a session start request (attachment acceptance) in TS19. In TS20, the UE 5 sets a terminal wireless bearer and returns a session start response to the wireless base station portion 4. In TS21, the wireless base station portion 4 notifies the MME 2 of a session start response. As described above, the attachment sequence in the UE 5 and the attachment sequence in the relay wireless communication portion 9 are basically executed according to the same procedure except for the content of the frequency channel setting.

In the LTE system, to flexibly change a transmission amount of notification information such as the above-described set channel number for each operation/environment, a fixed notification information resource using a PBCH and a variably usable wireless resource using a PDSCH are in combination. The PBCH that is a fixed resource is used because notification information is defined as information that the UE 5 (relay wireless communication portion 9) initially acquires, and it is necessary for the UE 5 (relay wireless communication portion 9) to be able to receive the notification information without receiving a notification from the wireless base station portion (eNodeB) 4. The UE 5 initially receives the PBCH that is a fixed resource, obtains the minimum information for receiving the PDSCH from the PBCH, and reads the notification information sent by the PDSCH on the basis of the minimum information. Since the PDSCH is a variable resource that can be allocated in RB units, an amount of notification information transmitted by the PDSCH is variable. Consequently, an amount of resources used for notification information can be changed, and wireless resources can be allocated according to an amount of notification information that differs depending on a network operation or environment.

In the notification information transmitted by the PBCH, the above MIB is transmitted at the beginning of the wireless frame (that is, a subframe number=0), and a time resource and a frequency resource can be allocated in a form of being always fixed. The transmitted information is typically, for example, information for receiving other notification information (for example, a system information block (SIB)) by using the PDSCH, a wireless frame number (system frame number: SFN), and the like. However, in this example, the wireless base station portion 4 distributes channel information of the terminal wireless bearer or the inter-unit wireless bearer to the UE 5 (relay wireless communication portion 9) by using this MIB. Although a size of the MIB is fixed to 24 bits, 10 bits of which are allocated to a spare area so that it is possible to incorporate the set channel information of the wireless bearer, for example, by using this spare area.

Next, as illustrated in FIG. 11, each of the EPC function portions 3 of two or more wireless communication units 1(A) to 1(D) sequentially connected by the inter-unit wireless bearers 55 can transfer node addresses (node identification information) of the UEs 5(A) to 5(D) (mobile terminals) connected to the wireless base station portions 4 of the individual wireless communication units 1(A) to 1(D) to other wireless communication units via the inter-unit wireless bearers 55(A) to 55(C). Consequently, it is possible to share the node addresses of the UEs 5(A) to 5(D) connected to the two or more wireless communication units 1(A) to 1(D) between the wireless communication units 1(A) to 1(D). The EPC function portion 3 creates a transfer table for IP packets on the basis of the shared node addresses (node identification information), and controls transfer of IP packets with reference to the transfer table. In this transfer table, the node identification information of the UE is registered for each node address of the wireless communication unit, and the transfer table functions as a connected terminal node registration section.

Figure 17:
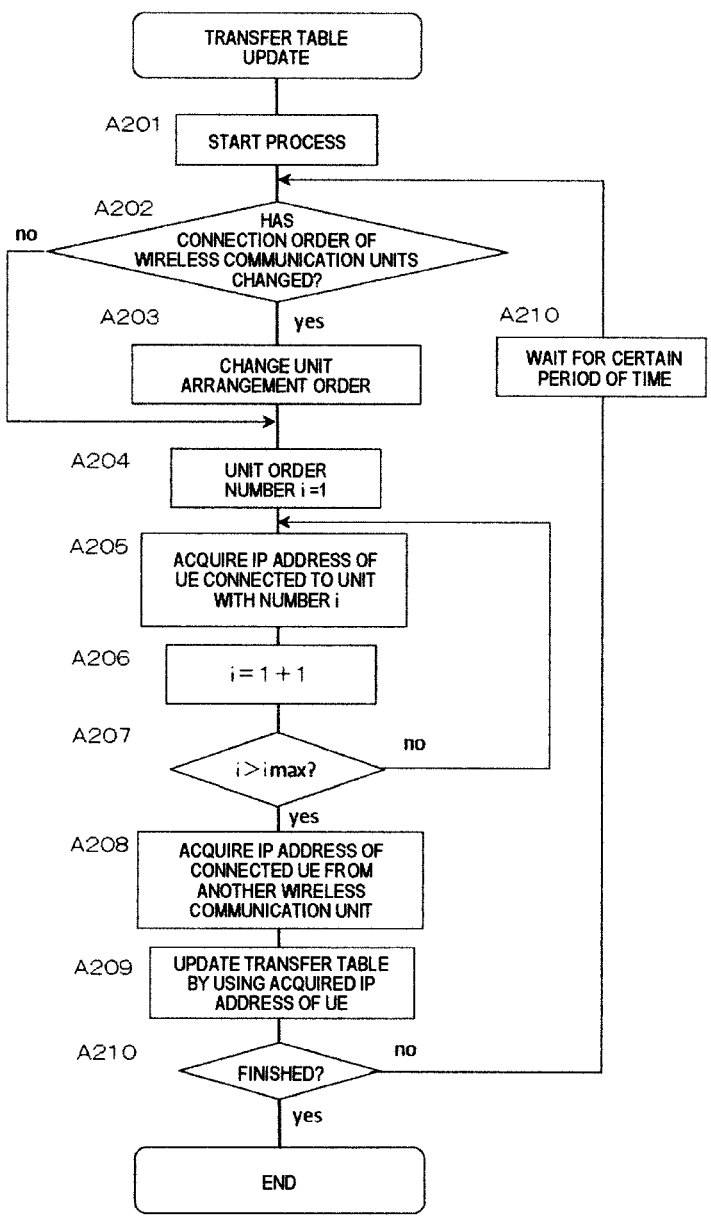
FIG. 17 is a diagram illustrating a flow of a transfer table update process.

FIG. 16 illustrates an example of the transfer table. The transfer table 305e registers therein a list form of node addresses (UEAD11, 12 . . . , UEAD21, 22 . . . ) of connected UEs for respective node addresses (MAD01 to MAD04) of individual wireless communication units. FIG. 17 illustrates a flow of an update process of the transfer table performed by each EPC function portion 3. When the process is started in A201, it is checked whether or not a connection order of the wireless communication units has changed in A202. If a connection order has changed, the flow proceeds to A203 and the arrangement order of the node addresses (MAD01 to MAD04) of the wireless communication units on the transfer table 305e is changed. On the other hand, if a connection order has not changed, A203 is skipped.

In A204, the order number i on the transfer table 305e of the wireless communication units is initialized, and in A205, an IP address of a UE connected to a wireless communication unit with the number i is acquired. In A205, the number i is incremented, and in A207, it is determined whether or not the number i exceeds the maximum value imax (a total number of the wireless communication units). If the number i does not exceed the total number, the flow returns to A205, and the processes up to A206 are repeatedly performed. On the other hand, if the number i exceeds the total number, the flow proceeds to A208, and an IP address of the connected UE is acquired from another wireless communication unit. The acquired IP address is stored in a table cell corresponding to the node address of the wireless communication unit with the number i in the transfer table 305e, and the content of the transfer table 305e are updated. In A209, it is determined whether or not the process is finished, and if not, the flow returns to A202 after waiting for a certain period of time in A210, and the following processes are repeatedly performed.

Figure 18:
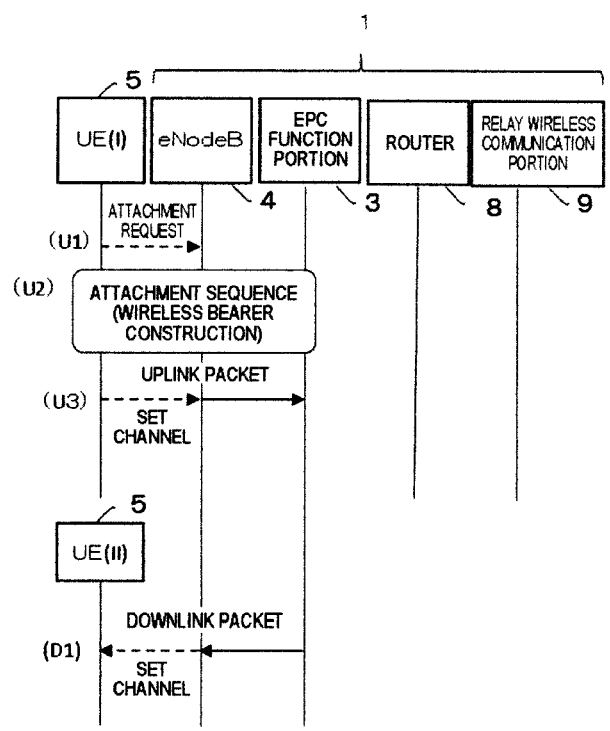
FIG. 18 is a communication flow diagram illustrating an IP packet transfer control sequence between UEs connected to the same wireless communication unit.

FIG. 18 illustrates a flow of a transmission process of IP packets between the UEs 5 (a UE(I) and a UE(II)) connected to the same wireless communication unit 1. U1 and U2 are the attachment sequences described with reference to FIG. 15, and a terminal wireless bearer is constructed. In U3, an IP packet is sent from the UE(I) to the wireless base station portion 4 as an uplink packet. The wireless base station portion 4 transfers the IP packet to the EPC function portion 3. The EPC function portion 3 refers to the transfer table 305e in FIG. 16, and checks whether or not an IP address of any UE connected to the wireless communication unit to which the EPC function portion 3 belongs matches a transmission destination address recorded in a header of the received IP packet. In FIG. 18, an IP address of the UE(II) corresponds to this, and the IP packet is transferred back to the subordinate wireless base station portion 4 as a downlink packet in D1. The wireless base station portion 4 receives the IP packet and transfers the IP packet to the UE(II), and the process is completed.

Figure 19:
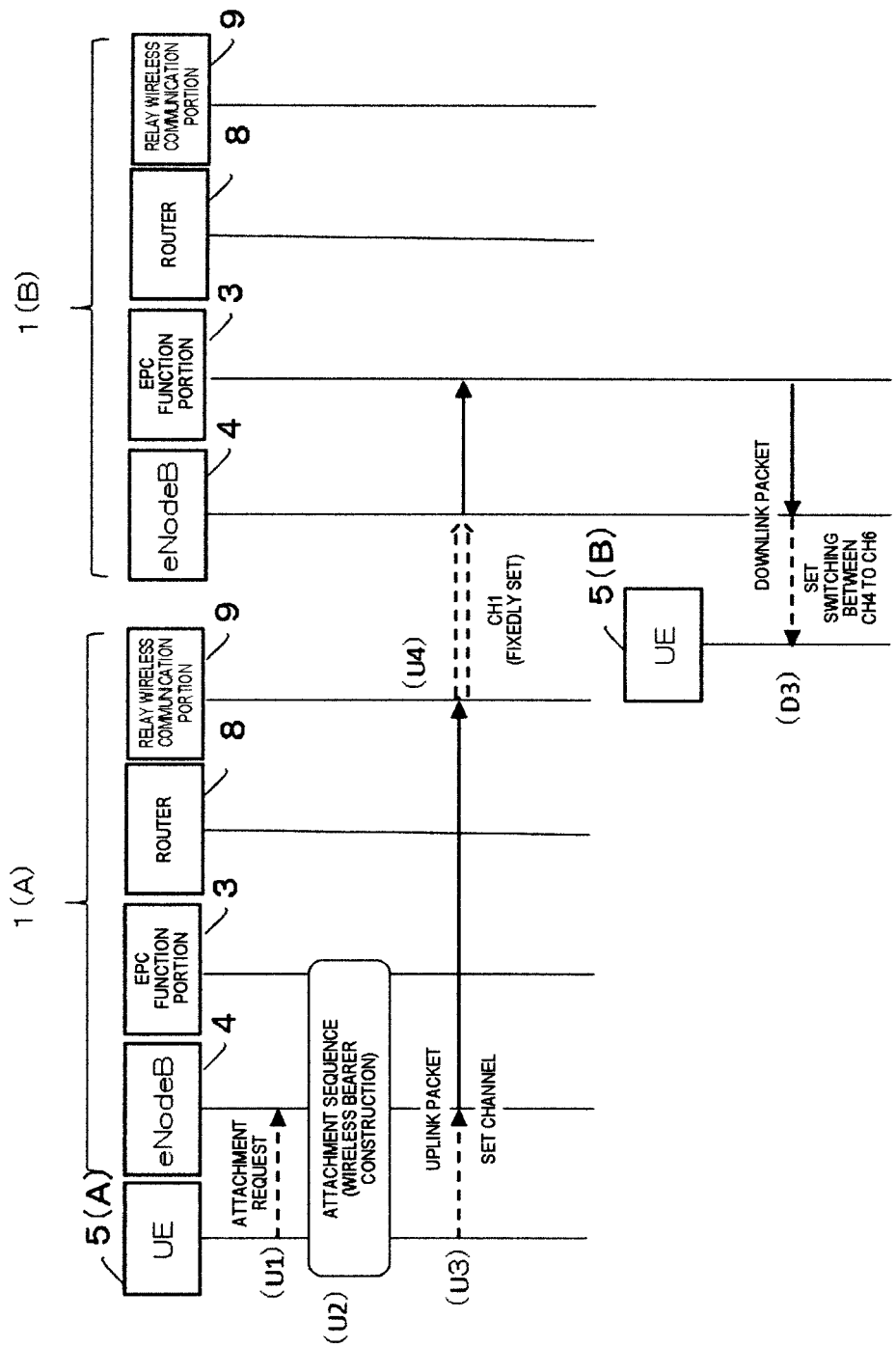
FIG. 19 is a communication flow diagram illustrating an IP packet transfer control sequence between UEs respectively connected to adjacent wireless communication units.

FIG. 19 illustrates a flow of an IP packet transfer process between the UE 5(A) connected to the wireless communication unit 1(A) and the UE 5(B) connected to the adjacent wireless communication unit 1(A) in FIG. 11. The processes from U1 to U3 are the same as those in FIG. 18. In U3, the EPC function portion 3 of the wireless communication unit 1(A) refers to the transfer table 305e, and confirms that the transmission destination address of the received IP packet does not match an IP address of any UE connected to the wireless communication unit 1(A) to which the EPC function portion 3 belongs and matches an IP address of a UE connected to the upstream wireless communication unit 1(B). In U4, the IP packet is transferred to the upstream wireless communication unit 1(B) by the inter-unit wireless bearer 55(A). The wireless communication unit 1(B) receives this IP packet, similarly refers to the transfer table 305e, and confirms that the IP address of the UE 5(B) matches the IP address of the transmission destination. In D2, the IP packet is transferred as a downlink packet to the subordinate wireless base station portion 4. The wireless base station portion 4 receives the IP packet and transfers the IP packet to the UE 5(B), and the process is completed.

For example, when a UE that is a transmission source of the IP packet is connected to an intermediate wireless communication unit in a group of wireless communication units that are sequentially connected, and a UE that is a transmission destination is connected to a wireless communication unit downstream of the wireless communication unit, the EPC function portion 3 refers to the transfer table 305e in the above U3, and confirms that the transmission destination address of the received IP packet does not match an IP address of any UE connected to the wireless communication unit to which the EPC function portion 3 belongs and matches an IP address of the UE connected to the downstream wireless communication unit. The IP packet is transferred to the wireless base station portion 4 as a downlink packet, and is further transferred to the wireless communication unit connected to the UE that is a transmission destination by using the downstream inter-unit wireless bearer.

Figure 20:
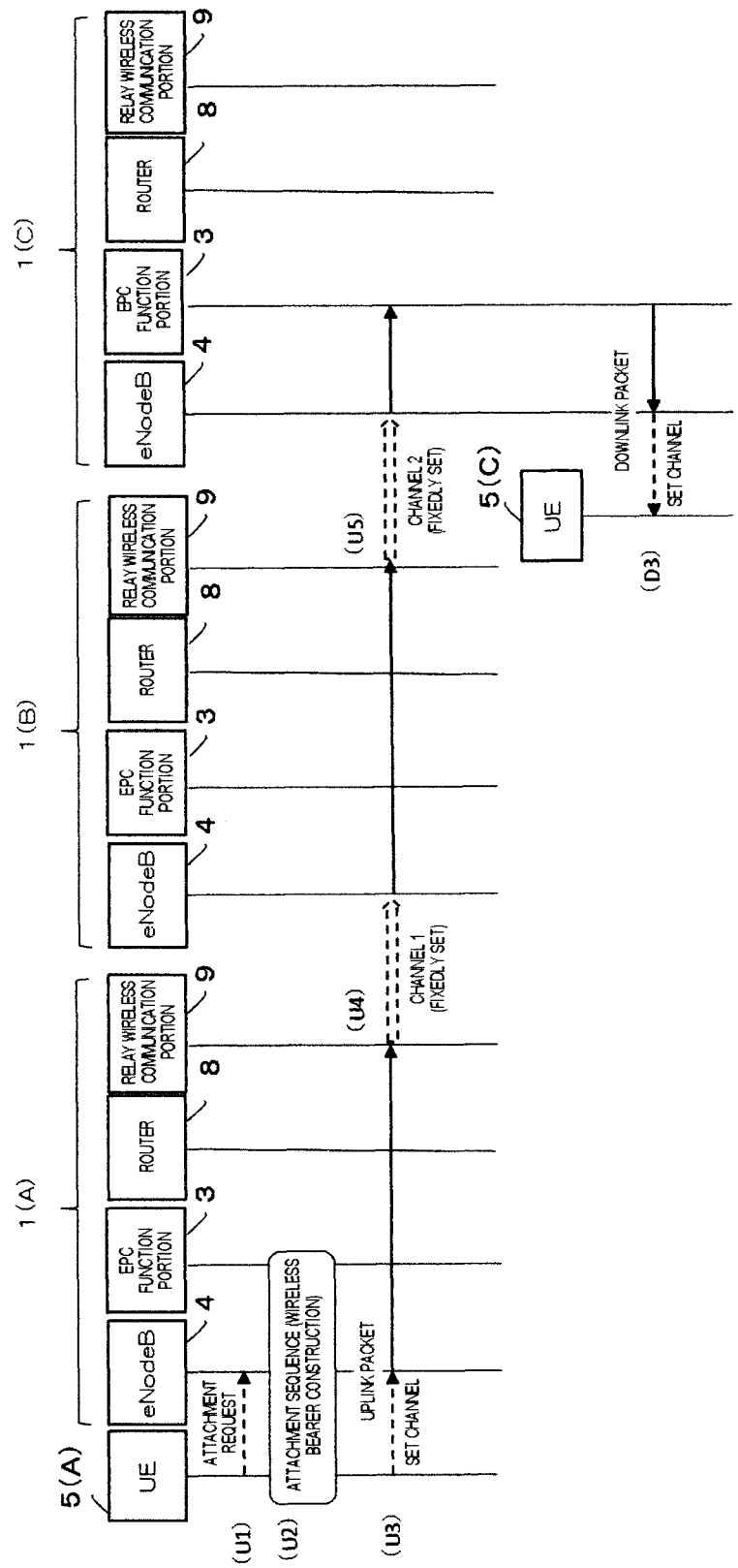
FIG. 20 is a communication flow diagram illustrating an IP packet transfer control sequence between UEs respectively connected to both ends of three sequentially connected wireless communication units.

FIG. 20 illustrates a flow of a transfer process of an IP packet between the UE 5(A) connected to the wireless communication unit 1(A) and the UE 5(C) connected to the wireless communication unit 1(C) two ahead in FIG. 11. The processes from U1 to U4 are the same as those in FIG. 19. In U4, the EPC function portion 3 of the wireless communication unit 1(B) refers to the transfer table 305e, confirms that the transmission destination address recorded in the header of the received IP packet does not match an IP address of any UE connected to the wireless communication unit 1(B) to which the EPC function portion 3 belongs, and transfers the IP packet to the upstream wireless communication unit 1(C) by using the inter-unit wireless bearer 55(B) in U5. The wireless communication unit 1(C) receives this IP packet, similarly refers to the transfer table 305e, and confirms that the IP address of the UE 5(C) matches the IP address of the transmission destination. In D3, the IP packet is transferred as a downlink packet to the subordinate wireless base station portion 4. The wireless base station portion 4 receives the IP packet and transfers the IP packet to the UE 5(C), and the process is completed.

Figure 21:
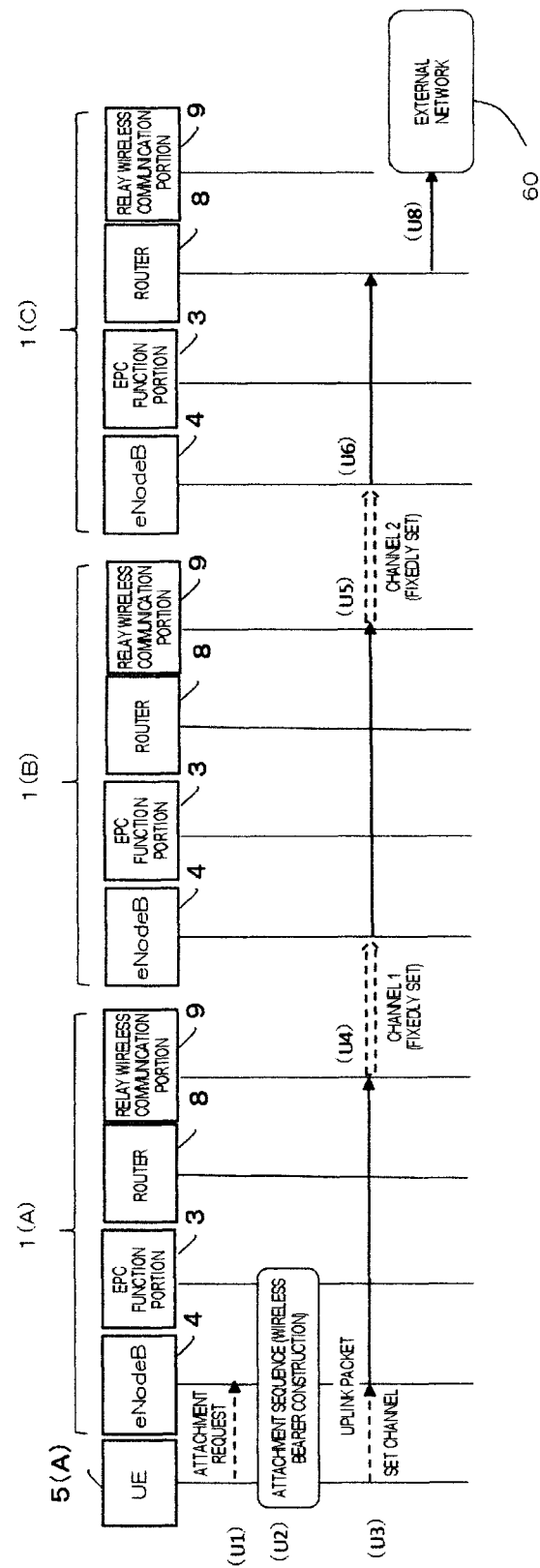
FIG. 21 is a communication flow diagram illustrating a control sequence for transferring an IP packet to an external network via a router of a wireless communication unit located at the end of three sequentially connected wireless communication units.
Figure 22:
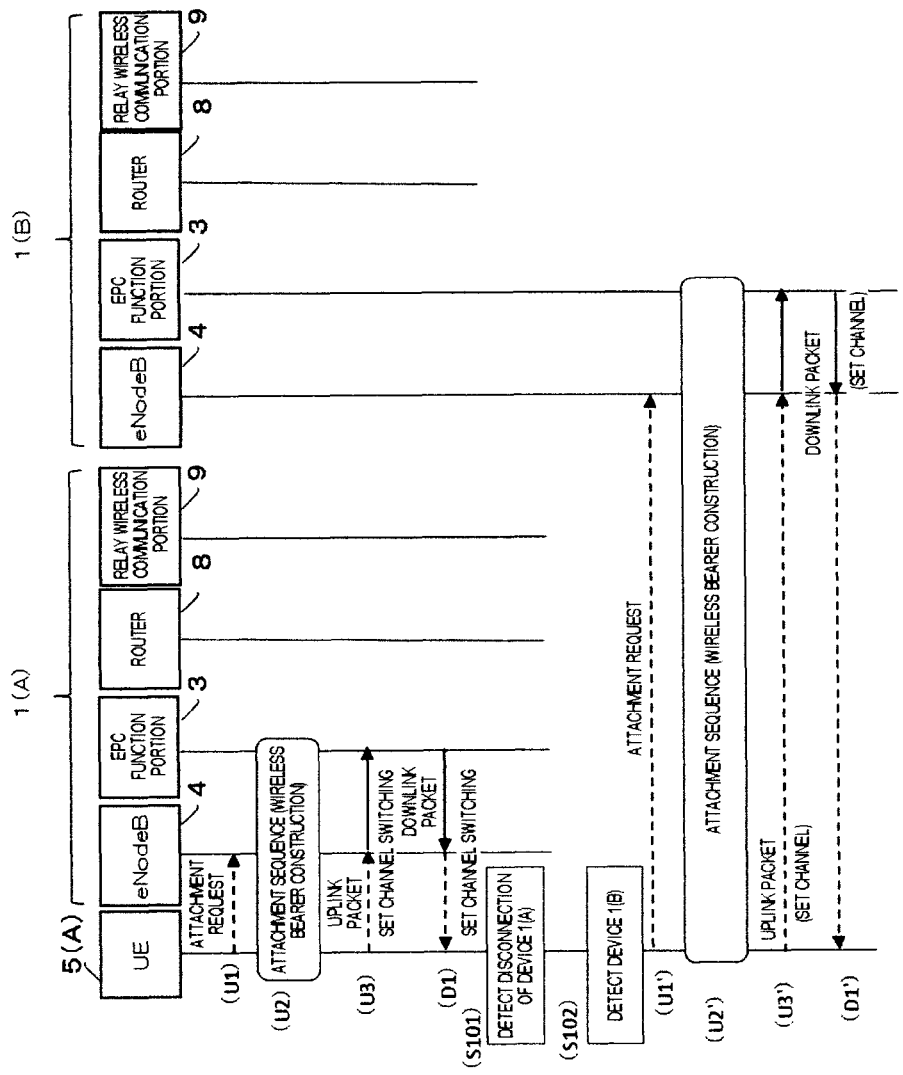
FIG. 22 is a communication flow diagram illustrating a control sequence of a simple handover process.

FIG. 21 illustrates a process when an IP packet from the UE 5(A) connected to the wireless communication unit 1(A) has a transmission destination address outside the wireless network system. The processes from U1 to U5 are the same as those in FIG. 20. In U5, the EPC function portion 3 of the wireless communication unit 1(C) refers to the transfer table 305e, and confirms that the transmission destination address recorded in the header of the received IP packet does not match an IP address of any UE connected to the wireless communication unit 1(C) to which the EPC function portion 3 belongs, and transfers the IP packet to the router 8 in U6. That is, when a transmission destination node of the transferred IP packet indicates a node not included in the transfer table 305e, the EPC function portion 3 of the wireless communication unit 1(C) provided with the router 8 transfers the IP packet to the external network 60 via the router 8.

More specifically, each of the wireless communication units 1(A) to 1(D) in FIG. 11 has the built-in router 8, but one of them, in FIG. 11, that is, among the sequentially connected wireless communication units 1(A) to 1(D), only the router 8 of the wireless communication unit 1(D) located at the upstream side end is connected to the external network 60. The external network 60 is a global public network (Internet) connected to the router 8 via, for example, a satellite communication line 61. With this configuration, it can be seen that the transfer process of an IP packet with a network other than the wireless network system as a transmission destination can be realized by a simple algorithm.

Figure 23:
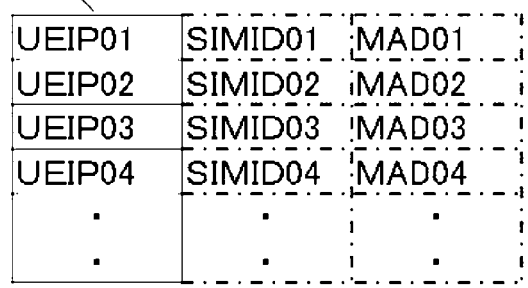
FIG. 23 is a diagram illustrating the concept of a UE list (connected terminal node registration section).

Regarding a transfer control process of an IP packet in each wireless communication unit, a simpler method using a connected terminal node registration section instead of the transfer table 305*e* illustrated in FIG. 16 may be employed. FIG. 23 illustrates an example thereof, and only node identification information of the UE 5 connected to the wireless communication unit 1 provided with a connected terminal node registration section 305*f* is stored as a list. The node identification information is an IP address of a connected UE (UEIP01, UEIP02, . . . ), but is not limited to this as long as the information can identify the UE 5 as a connection node and, for example, IMSI (terminal subscriber information of the UE 5: SIMID01, SIMID02, . . . ) stored in a subscriber identity module (SIM) card incorporated in the UE 5 or an MAC address (MAD01, MAD02, . . . ) of the device may also be used.

That is, in FIG. 11, the EPC function portion 3 of each of the wireless communication units 1(A) to 1(D) is provided with a connected terminal node registration section 305*f* in which, with respect to a plurality of UEs 5(A) to 5(D) (mobile terminals) connected to the wireless base station portion 4 via the terminal wireless bearers 57(A) to 57(D) in a cell (communication area) of the wireless base station portion 4, node identification information of the connected UEs 5(A) to 5(D) is registered. The EPC function portion 3 collates a transmission destination node (transmission destination address) of an IP packet transferred from the wireless base station portion 4 with the content registered in the connected terminal node registration section 305*f*, and transfers, when the transmission destination node indicates a UE (mobile terminal) corresponding to any of the pieces of node identification information registered in the connected terminal node registration section 305*f*, the IP packet to the UE in a form of returning the IP packet at the wireless base station portion 4.

On the other hand, when the transmission destination node indicates a node that is not registered in the connected terminal node registration section 305, the IP packet is transferred to both the relay wireless communication portion 9 and the wireless base station portion 4. That is, a difference from the example of using the transfer table 305*e* is that the EPC function portion 3 that has received an IP packet indicating an external transmission destination cannot determine whether a transmission destination node is present upstream or downstream on the basis of only the content of the connected terminal node registration section 305*f*. Therefore, for an IP packet indicating an external transmission destination, a transmission direction is not particularly limited, and this problem is solved by transferring the IP packet both upstream and downstream.

Figure 24:
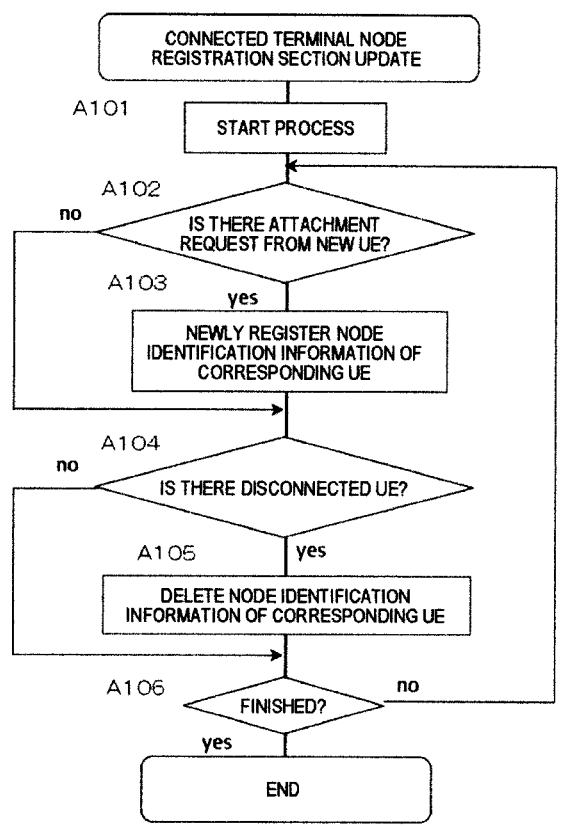
FIG. 24 is a diagram illustrating a flow of a UE list update process.

Unlike the method using the transfer table 305*e* in FIG. 16, the method using the connected terminal node registration section 305 has an advantage that it is not necessary to perform a communication process for sharing the identification information of the connected UE with other wireless communication units to update the content. That is, each wireless communication unit need only concentrate on a process of specifying a state of a UE connected thereto. FIG. 24 illustrates a flow of the process. When the process is started in the A101, it is checked in the A102 whether or not there is an attachment request from a new UE. If there is an attachment request, the flow proceeds to A103, and node identification information of the corresponding UE is newly registered, and if there is no attachment request, A103 is skipped. Next, in A104, it is checked whether or not there is a disconnected UE. If there is a disconnected UE, the flow proceeds to A105, and node identification information of the corresponding UE is deleted, and if there is no disconnected UE, A105 is skipped.

For example, when focusing on the wireless communication unit 1(B) in FIG. 11, the relay wireless communication portion 9 transfers the IP packet transferred from the EPC function portion 3 to the wireless base station portion 4 (upstream wireless base station portion) of the upstream wireless communication unit 1(C) as an uplink packet via the upstream inter-unit wireless bearer 55(B). On the other hand, the wireless base station portion 4 of the wireless communication unit 1(B) transfers the IP packet transferred from the EPC function portion 3 to the wireless base station portion 4 (downstream wireless base station portion) of the downstream wireless communication unit 1(A) as a downlink packet via the downstream inter-unit wireless bearer 55(A). By performing this process in each wireless communication unit 1(A) to 1(D), in a an example where a UE that is a transmission destination is present in the wireless network system, a transmission destination of an IP packet that is a transfer target can necessarily be specified to either an uplink or a downlink. Of the uplink and the downlink, on a side where a transmission destination of an IP packet that is a transfer target is not present, the IP packet reaches a wireless communication unit at the end of the link, but when a UE that is a transmission destination cannot be found in the wireless communication unit at the end, the wireless communication unit may perform a process of invalidating the IP packet (for example, a process of discarding the IP packet).

When considering the process when the IP packet that is a transfer target indicates the transmission destination address outside the wireless network system, a configuration is made such that a unit located at one end (referred to as the wireless communication unit 1(A) in FIG. 11) among the wireless communication units 1(A) to 1(D) sequentially connected as illustrated in FIG. 11 is defined as a unit that executes the process of discarding the IP packet, and a unit located at the other end (referred to as the wireless communication unit 1(D) in FIG. 11) is connectable to the external network 60 via the router 8. For example, an IP packet of which a transmission source is designated as a UE connected to the intermediate wireless communication unit 1(B) and a transmission destination is designated toward the external network 60 is transferred to the downlink side in this method and discarded by the wireless communication unit 1(A), and thus only an IP packet transmitted to the uplink side is not discarded and finally reaches the wireless communication unit 1(D). When a description is made with reference to FIG. 19, the wireless communication unit 1(D) confirms that the transmission destination address recorded in the header of the received IP packet does not match an IP address of any UE in the connected terminal node registration section 305*f*, and transfers the IP packet to the router 8 in U6. The IP packet is sent to the external network 60 via the router 8.

Next, the above simple handover process will be described.

As already described with reference to FIG. 2, in this example, one wireless communication unit 1(A) and the other wireless communication unit 1(B) forming a wireless communication unit pair are configured to be communicatively connected to each other by only the inter-unit wireless bearer 55. That is, a control interface for direct connection between the wireless base stations 4 and 4 of the pair of wireless communication units 1(A) and 1(B) is omitted (that is, the conventional X2 interface is not provided). Therefore, when the mobile terminal 5(A) connected to the wireless communication unit 1(A) in FIG. 11 moves into the communication cell 50B of the wireless communication unit 1(B), the normal handover process using the X2 interface cannot be performed. Therefore, in example, the following simple handover process is executed according to the sequence illustrated in FIG. 20. That is, the UE 5(A) executes the attachment sequence illustrated in FIG. 15 in U1 and U2 for the wireless communication unit 1(A), and constructs a terminal wireless bearer with the wireless communication unit 1(A). Consequently, the UE 5(A) can transmit and receive uplink packets (U3) and downlink packets (D1) to and from the wireless communication unit 1(A).

In S101, the UE 5 (mobile terminal) detects disconnection of the terminal wireless bearer that connects the wireless base station portion 4 of the wireless communication unit 1(A) to the UE 5 (mobile terminal), and further, in S102, when the UE 5 detects the wireless communication unit 1(B) that is a movement destination, the UE 5 makes a new attachment request to the wireless communication unit 1(B) in U1'. In response to this attachment request, the wireless communication unit 1(B) establishes a new terminal wireless bearer with the UE 5 on the basis of the same process as in U2. That is, on the basis of a command from the EPC function portion 3 of the wireless communication unit 1(B), a terminal wireless bearer is reconstructed between the wireless base station portion 4 of the wireless communication unit 1(B) and the UE 5(A) (mobile terminal) after the movement. Through the above process, it can be seen that, despite the environment in which an inter-base station interface does not exist, a substantial handover process associated with the inter-cell movement of the UE 5 can be realized.

Figure 25:
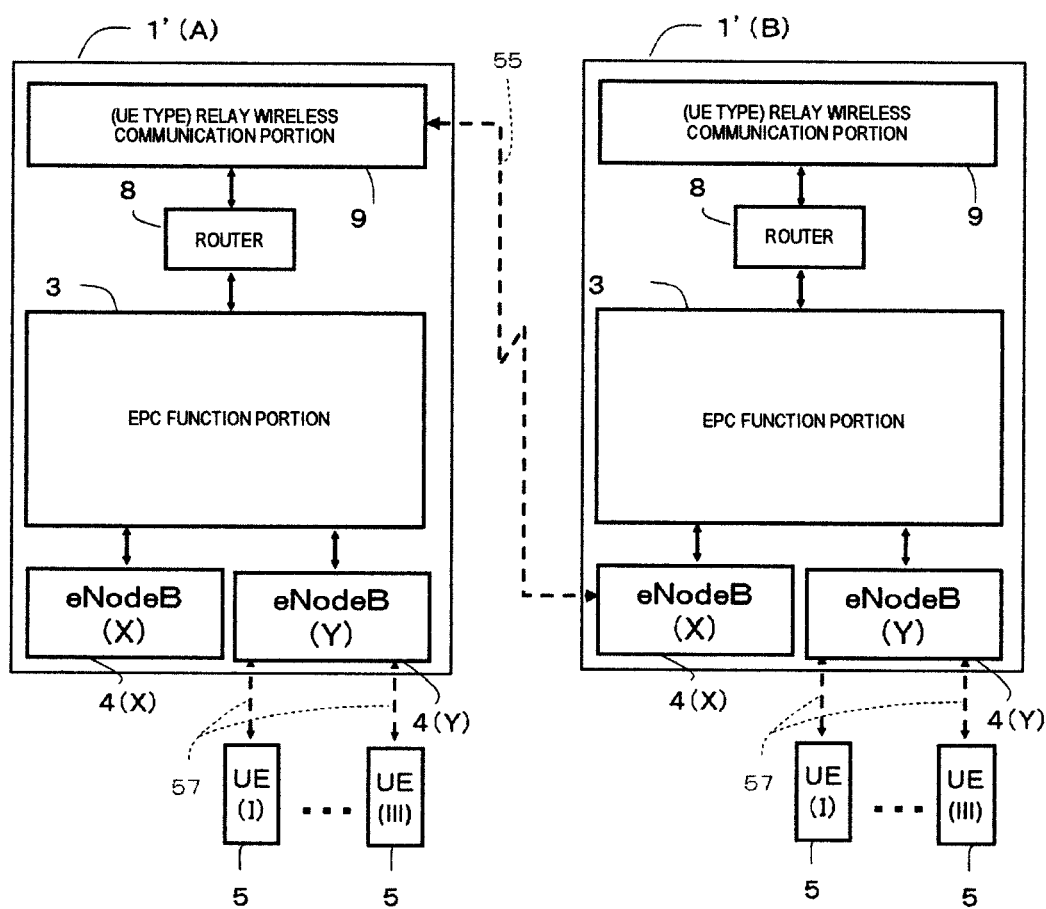
FIG. 25 is a block diagram illustrating a first modification example of the wireless communication unit pair.

The examples of our wireless communication units and systems have been described above, but are merely examples, and this disclosure is not limited thereto. For example, in wireless communication units 1'(A) and 1'(B) illustrated in FIG. 25, the wireless base station portion is provided in a form of being separated into a wireless base station portion 4(X) for constructing the inter-unit wireless bearer 55 and a wireless base station portion 4(Y) for constructing the terminal wireless bearer 57. In the pair of wireless communication units 1'(A) and 1'(B), the inter-unit wireless bearer 55 is constructed between the relay wireless communication portion 9 of the upstream unit 1'(A) and the wireless base station portion 4(X) of the downstream unit 1'(B), and the UE 5 is connected only to the wireless base station portion 4(Y). In this example, communication methods using different protocols may be employed between the relay wireless communication portion 9 and the wireless base station portion 4(X), and between the UE 5 and the wireless base station portion 4(Y). In this example, the wireless base station portion 4(X) and the wireless base station portion 4(Y) are installed with communication protocol stacks of different methods. In this example, the inter-unit wireless bearer 55 and the terminal wireless bearer 57 may be set to frequency channels in different bands. The relay wireless communication portion 9 and the wireless base station portion 4(X), and the UE 5 and the wireless base station portion 4(Y) may be set to frequency channels in different bands in the same communication method. An inter-unit channel set in the inter-unit wireless bearer 55 is not fixed to one frequency channel, but may be appropriately switched and set between a plurality of frequency channels.

The wireless communication unit 1 is not limited to the form in which a plurality of wireless communication units 1 are sequentially connected by the inter-unit wireless bearer 55 as illustrated in FIG. 11, and only one unit may be used independently. In FIG. 11, when the wireless communication unit 1(A) located at one end of the line of three or more (four in FIG. 11) wireless communication units 1(A) to 1(D) sequentially connected by a plurality of inter-unit wireless bearers 55(A) to 55(C) is set as a first end wireless communication unit and the wireless communication unit 1(D) located at the other end is set as a second end wireless communication unit, the relay wireless communication portion 9 of the first end wireless communication unit 1(A) and the wireless base station portion 4 of the second end wireless communication unit 1(D) may be connected to each other by an inter-unit wireless bearer 55(X) different from the plurality of inter-unit wireless bearers 55(A) to 55(C). The three or more wireless communication units 1(A) to 1(D) in the line are sequentially connected in an endless manner by constructing the other inter-unit wireless bearer 55 (X). By connecting the wireless communication units 1(A) to 1(D) endlessly as described above, one of the plurality of inter-unit wireless bearers 55(A) to 55(C) and 55 (X) is made redundant. Therefore, even if any of them is disconnected due to a malfunction of the relay wireless communication portion 9 or the wireless base station portion 4, the wireless communication units 1(A) to 1(D) can be maintained in a state of being sequentially connected to each other by the remaining normal inter-unit wireless bearer, and thus mutual communication of the UE 5(A) connected to each of the wireless communication units 1(A) to 1(D) can be guaranteed. In FIG. 11, the inter-unit wireless bearer 55 (X) is set to CH4 according to the channel map 305g in FIG. 12.

Figure 26:
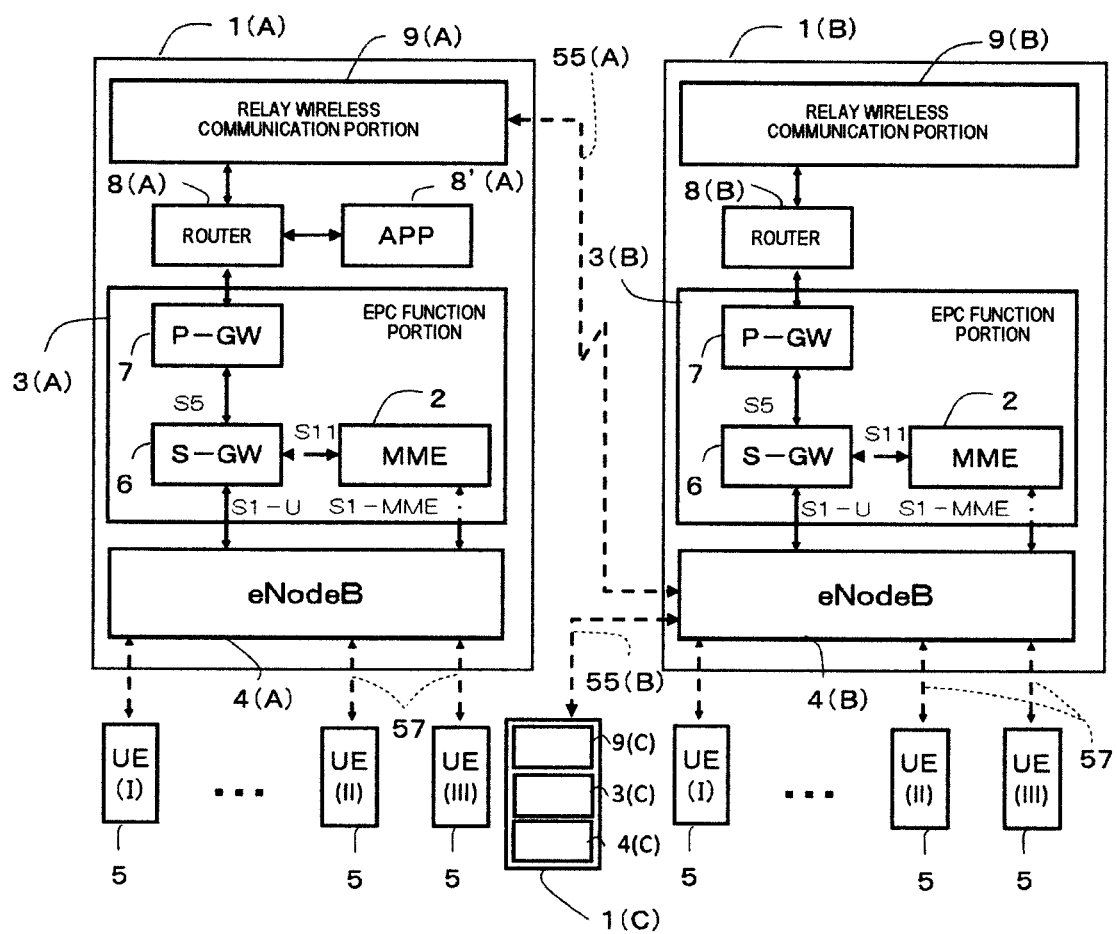
FIG. 26 is a block diagram illustrating a second modification example of the wireless communication unit pair.

The number of other wireless communication units 1 (relay wireless communication portions 9 thereof) that can be simultaneously attached to the wireless base station portion 4 may be set to two or more. For example, in the wireless communication unit 1(A) and the wireless communication unit 1(B) illustrated in FIG. 2, relay wireless communication portions of a plurality of downstream units may be configured to be connectable to the wireless base station portions 4(A) and 4(B) via downstream inter-unit wireless bearers corresponding to the downstream units on a one-to-one basis. In the example illustrated in FIG. 26, the relay wireless communication portion 9(A) of the wireless communication unit 1(A) is connected to the wireless base station portion 4(B) of the wireless communication unit 1(B) by the inter-unit wireless bearer 55(A) and is connected to the relay wireless communication portion 9(C) of the wireless communication unit 1(C) by the inter-unit wireless bearer 55(C). That is, in the wireless base station portions, the relay wireless communication portions of a plurality of downstream units are simultaneously connectable to one wireless base station portion. The wireless communication unit 1(C) also includes a wireless base station portion 4(C) and an EPC function portion 3(C). With this configuration, variations of the connection topology of a plurality of wireless communication units are significantly increased.

For example, in a state B1 in FIG. 27, the three wireless communication units 1(A) to 1(C) are connected by the inter-unit wireless bearers 55(A) to 55(B), and a new wireless communication unit 1(D) is approaching toward the leading (upstream end) wireless communication unit 1(C). One wireless communication unit 1(B) is already connected to the wireless base station portion 4 of the wireless communication unit 1(C), and another new wireless communication unit is connectable thereto. When the relay wireless communication portion (9) of the approaching wireless communication unit 1(D) enters a range of the eNodeB 4 of the wireless communication unit 1(C) that is an approaching target, the relay wireless communication portion 9 of the wireless communication unit 1(D) transmits an attachment request to the eNodeB 4 of the wireless communication unit 1(C). Consequently, a second inter-unit wireless bearer 55(C) is constructed between the wireless communication unit 1(D) and the wireless communication unit 1(C) as in a state B2, and the wireless communication unit 1(D) is incorporated into the wireless network system in a branched form.

As shown in the state B2 in FIG. 27, when a new wireless communication unit 1 (E) is approaching the end wireless communication unit 1(C), when the relay wireless communication portion 9 of the wireless communication unit 1(C) enters a range of the eNodeB 4 of the approaching wireless communication unit 1(D), the relay wireless communication portion 9 of the wireless communication unit 1(C) outputs an attachment request to the eNodeB 4 of the wireless communication unit 1(D). Therefore, the inter-unit wireless bearer 55(C) is constructed between them, and the wireless communication unit 1(E) can be similarly incorporated into the wireless network system.

Figure 28:
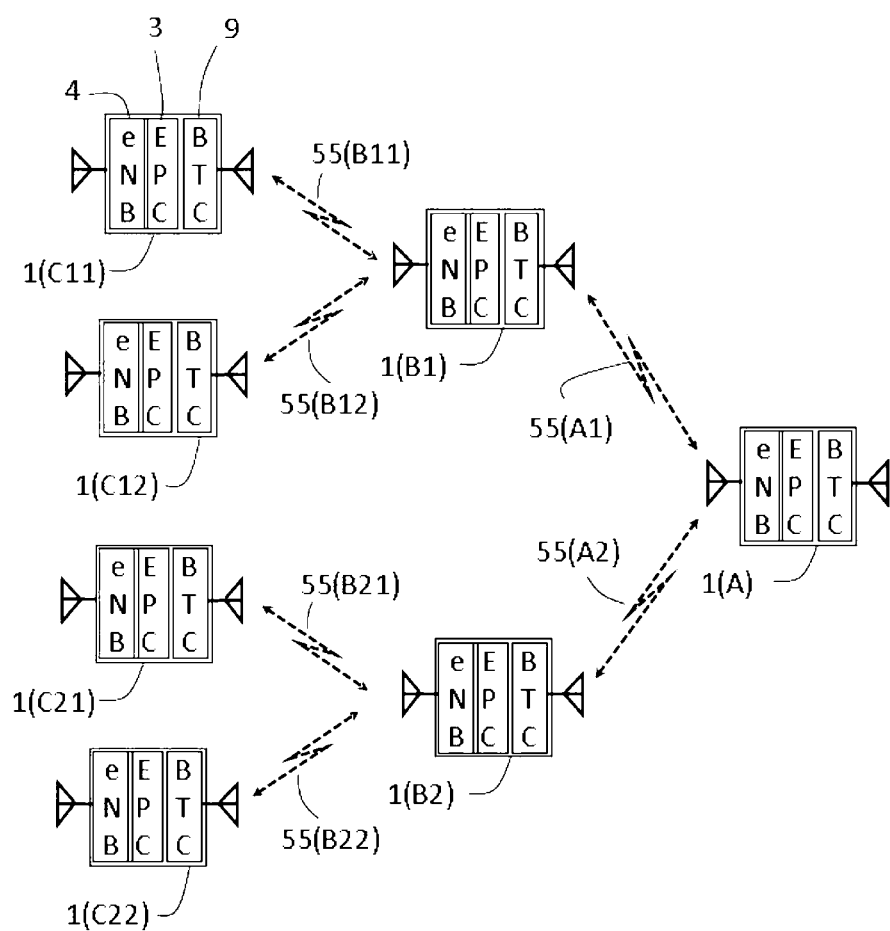
FIG. 28 is a diagram illustrating an example of a wireless network system in which a plurality of wireless communication units in FIG. 26 are connected in a tree form.
Figure 29:
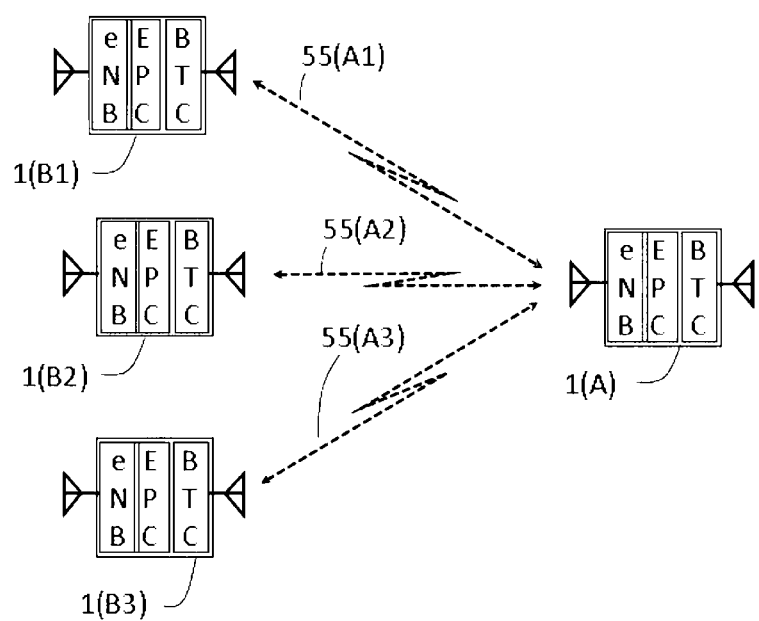
FIG. 29 is a diagram illustrating an example of a wireless network system in which three wireless communication units are connected to one wireless communication unit.

As illustrated in FIG. 28, a plurality of wireless communication units 1(B1) and 1(B2) are branched and connected to the wireless communication unit 1(A) forming a starting point, and a plurality of wireless communication units 1(C11), 1(C12), 1(C21), and 1(C22) are further branched and connected downstream thereof. This is sequentially repeated, and thus a wireless network system that follows a tree-like topology can be constructed. An upper limit of the number of wireless communication units (relay wireless communication portions thereof) that are connectable to one wireless base station portion is not limited to two, and as illustrated in FIG. 29, for example, three (or more) wireless communication units 1(B1) to 1(B3) may be branched and connected to the wireless base station portion (eNodeB) 4 of one wireless communication unit 1(A).

Figure 30:
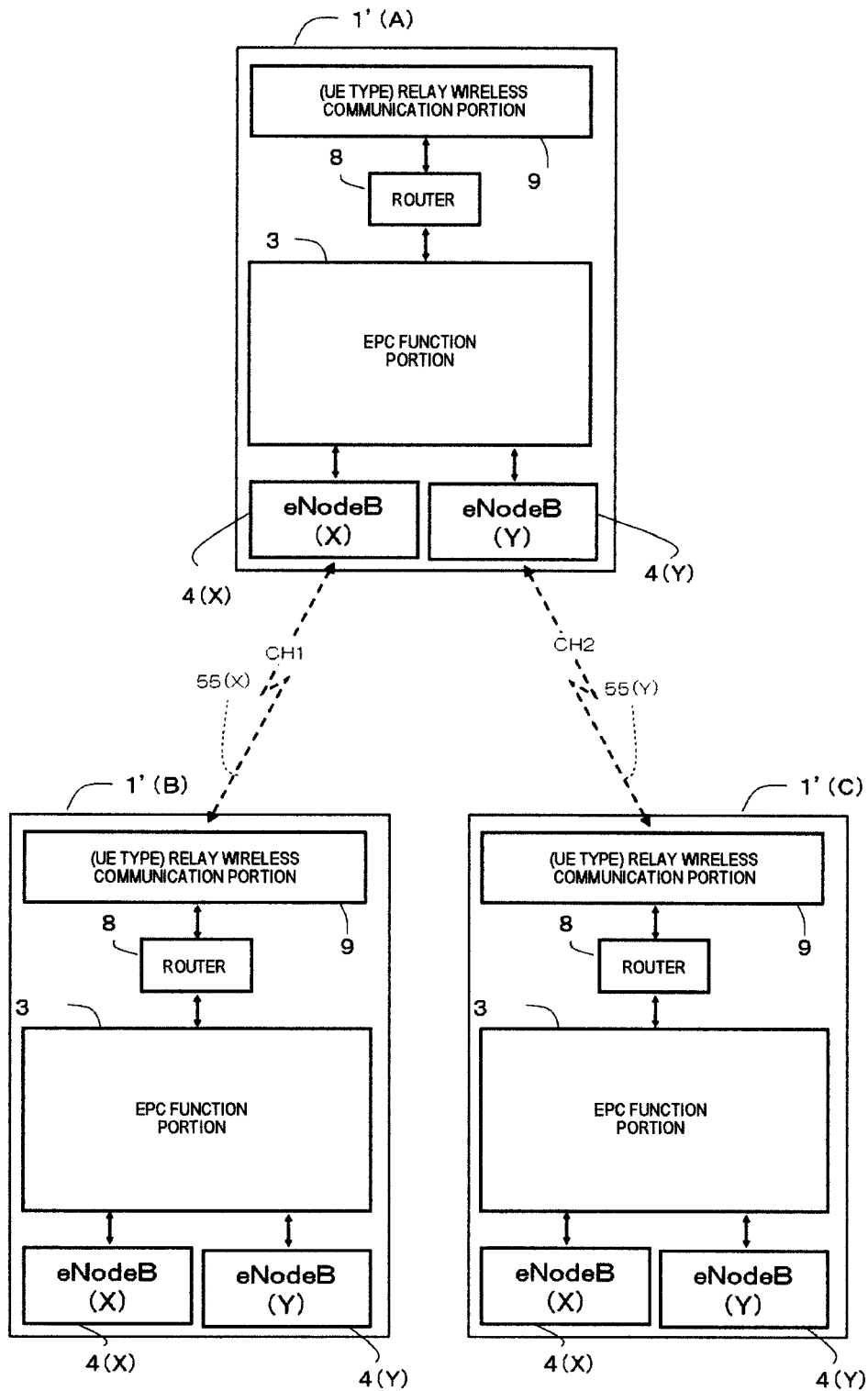
FIG. 30 is a diagram illustrating an example of a wireless network system configured by using a wireless communication unit provided with a plurality of wireless base station portions.

For example, wireless communication units 1'(A) to 1'(C) illustrated in FIG. 30 are provided with a plurality of wireless base station portions 4(X) and 4(Y) capable of independently constructing the inter-unit wireless bearer 55. In FIG. 30, the wireless communication unit 1'(A) is used as an upstream unit, the wireless communication unit 1'(B) as a downstream unit is connected to the wireless base station portion 4(X) in a form of constructing the inter-unit wireless bearer 55 (X) therebetween, and the wireless communication unit 1'(C) is connected to the wireless base station portion 4(Y) in a form of constructing the inter-unit wireless bearer 55 (Y) therebetween. In this example, the inter-unit wireless bearer 55 (X) and the inter-unit wireless bearer 55 (Y) may be set to different frequency channels. Consequently, the communication capacity (throughput) between the inter-unit wireless bearer 55 (X) and the inter-unit wireless bearer 55 (Y) can be significantly increased.

Figure 31:
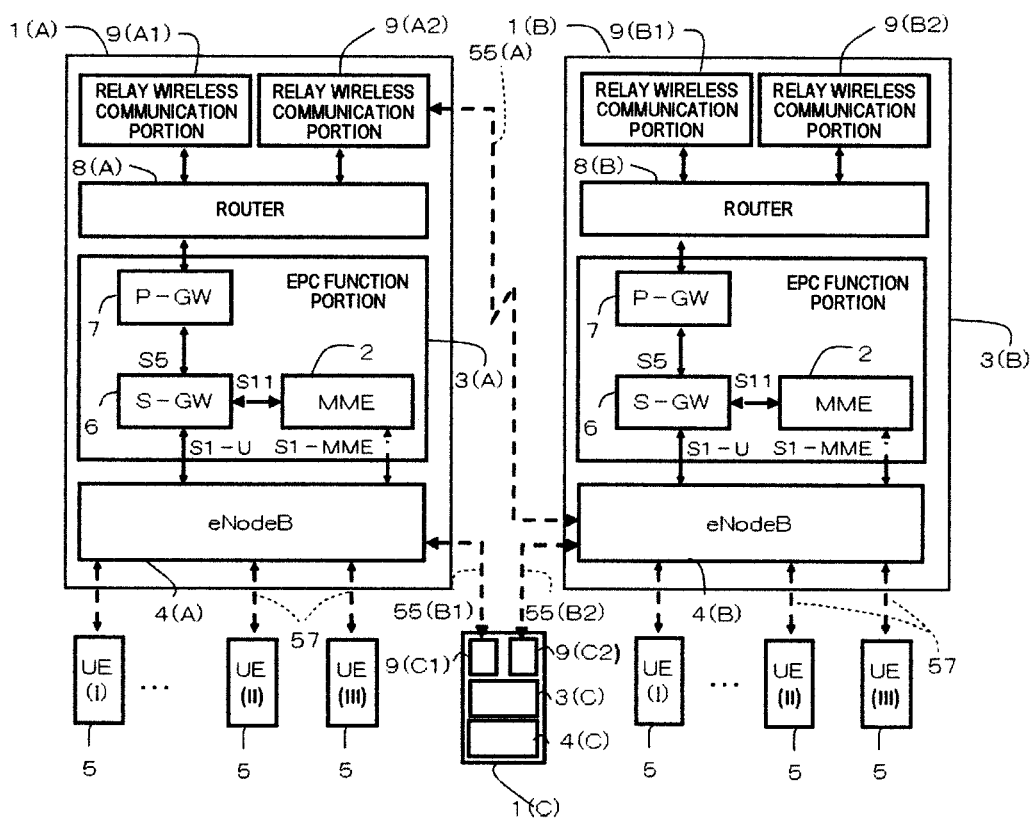
FIG. 31 is a block diagram illustrating a third modification example of the wireless communication unit pair.
Figure 32:
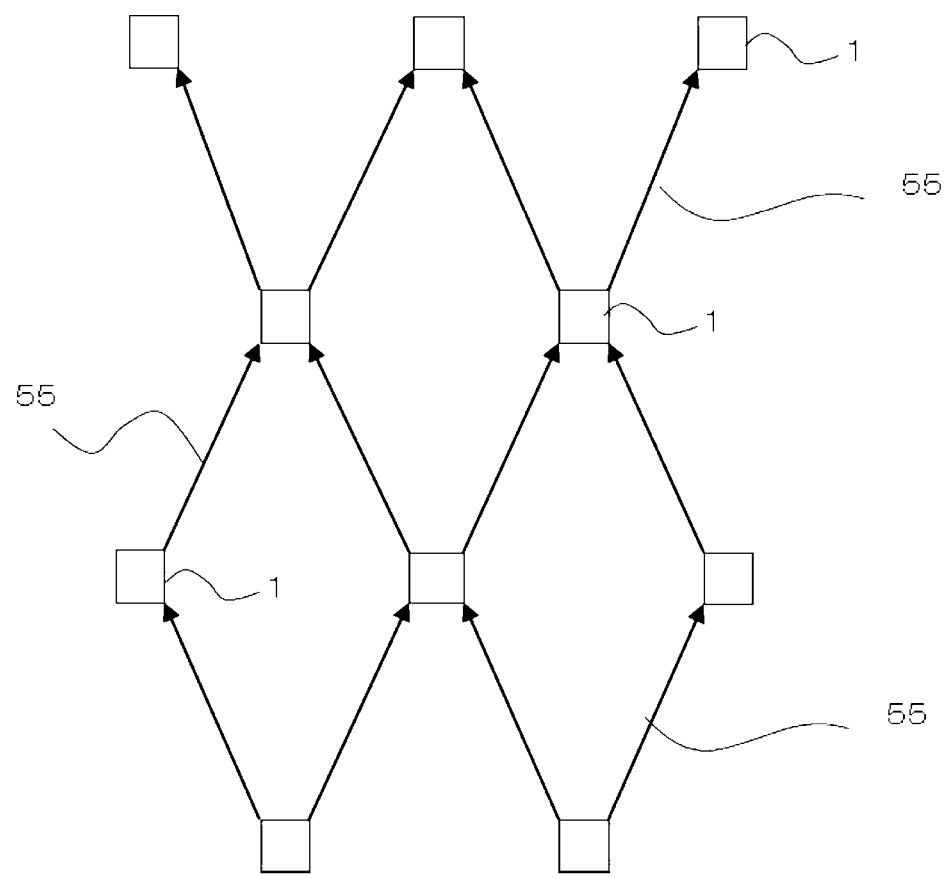
FIG. 32 is a schematic diagram illustrating a construction example of a wireless communication system in which the wireless communication units in FIG. 31 are connected in a plurality of mesh patterns by inter-unit wireless bearers.

As illustrated in FIG. 31, the wireless communication units 1(A) (1(B)) may have a configuration in which a plurality of relay wireless communication portions 9(A1) and 9(A2) (9(B1) and 9(B2)) are connected to the EPC function portion 3(A) (3(B)) (two in FIG. 31, but may be three or more). By using the wireless communication unit 1 having such a configuration, as illustrated in FIG. 32, the two relay wireless communication portions of each wireless communication unit 1 are connected (attached) to the wireless base station portions of different wireless communication units, and thus it is possible to construct a wireless network system in which a plurality of wireless communication units 1 are connected in a mesh pattern by the inter-unit wireless bearers 55 (an arrow indicates a direction of attachment, a starting point of the arrow corresponds to the relay wireless communication portion, and an ending point of the arrow corresponds to the wireless base station portion).

The invention claimed is:

1. A wireless communication unit that performs wireless network commun- ication with a mobile terminal in accordance with a communication protocol stack defined in Third Generation Partnership Project (3GPP), the wireless communication unit comprising:
   a wireless base station portion to which the mobile terminal is connectable via a terminal wireless bearer;
   an Evolved Packet Core (EPC) function portion connected by wire to the wireless base station portion and functions as an upper network control portion for the wireless base station portion; and
   a relay wireless communication portion connected by wire to the EPC function portion, and is also connectable to a wireless base station portion (hereinafter referred to as an upstream wireless base station portion) of an upstream unit that is another first wireless communication unit via an upstream inter-unit wireless bearer,
   wherein the wireless base station portion is connectable to a downstream relay wireless communication portion of a downstream unit that is another second wireless communication unit via a downstream inter-unit wireless bearer,
   the EPC function portion transmits a downstream inter-unit wireless bearer setting request to the wireless base station portion, and the wireless base station portion constructs the downstream inter-unit wireless bearer together with the downstream relay wireless communication portion according to conditions indicated by the downstream inter-unit wireless bearer setting request,
   the EPC function portion transmits a terminal wireless bearer setting request to the wireless base station portion, and the wireless base station portion constructs the terminal wireless bearer together with the mobile terminal according to conditions indicated by the terminal wireless bearer setting request,
   the relay wireless communication portion receives an upstream inter-unit wireless bearer setting request issued by an upstream EPC function portion of the upstream unit, and constructs the upstream inter-unit wireless bearer together with the upstream wireless base station portion according to conditions indicated by the upstream inter-unit wireless bearer setting request, and
   the EPC function portion
      includes a connected terminal node registration section in which, with respect to a plurality of the mobile terminals connected to the wireless base station portion via the terminal wireless bearer in a communication area of the wireless base station portion, pieces of node identification information of the connected mobile terminals are registered, and performs control of collating a transmission destination node of an IP packet transferred from the wireless base station portion with registered content of the connected terminal node registration section, transferring, when the transmission destination node indicates a mobile terminal corresponding to any of the pieces of node identification information registered in the connected terminal node registration section, the IP packet to the mobile terminal in a form of returning the IP packet at the wireless base station portion, and transferring, when the transmission destination node indicates a node that is not registered in the connected terminal node registration section, the IP packet to a transmission destination outside the wireless communication unit from at least one of the relay wireless communication portion and the wireless base station portion.

2. The wireless communication unit according to claim 1, wherein the connected terminal node registration section registers an IP address of the mobile terminal as the node identification information of the connected mobile terminal.

3. The wireless communication unit according to claim 1, further comprising:
a router provided between the EPC function portion and the relay wireless communication portion to relay transmission and reception of the IP packet between the EPC function portion and an external network,
wherein the EPC function portion transfers, when the transmission destination of the IP packet is a node on the external network connected thereto via the router, the IP packet to the router.

4. The wireless communication unit according to claim 1, wherein the downstream inter-unit wireless bearer and the upstream inter-unit wireless bearer are constructed according to a wireless protocol stack of the same method as that of the terminal wireless bearer.

5. The wireless communication unit according to claim 1, wherein the EPC function portion fixedly sets a set frequency channel of the downstream inter-unit wireless bearer to a downstream inter-unit channel that is one predefined specific frequency channel.

6. The wireless communication unit according to claim 5, wherein, when the upstream inter-unit wireless bearer is constructed, the EPC function portion sets the downstream inter-unit channel to a frequency channel different from an upstream inter-unit channel set for the upstream inter-unit wireless bearer.

7. The wireless communication according to claim 6, wherein the down-stream inter-unit channel and the upstream inter-unit channel each belong to one of a plurality of bands defined in the 3GPP and are set to different frequency channels in the same band.

8. The wireless communication unit according to claim 7, wherein a terminal side channel that is a set frequency channel of the terminal wireless bearer is set to the same channel as the downstream inter-unit channel among frequency channels belonging to the same band.

9. The wireless communication unit according to claim 1, wherein the relay wireless communication portion has only one wireless base station portion capable of constructing the upstream inter-unit wireless bearer.

10. A wireless communication system comprising:
a wireless communication unit group including two or more wireless communication units disposed to be sequentially adjacent,
wherein each of the wireless communication unit is configured to perform wireless network communication with a mobile terminal in accordance with a communication protocol stack defined in Third Generation Partnership Project (3GPP), and includes
a wireless base station portion to which the mobile terminal is connectable via a terminal wireless bearer,
an Evolved Packet Core (EPC) function portion connected by wire to the wireless base station portion and functions as an upper network control portion for the wireless base station portion, and
a relay wireless communication portion that is connected by wire to the EPC function portion, and is also connectable to an upstream wireless base station portion of an upstream unit that is another first wireless communication unit via an upstream inter-unit wireless bearer,
wherein the wireless base station portion is connectable to a downstream relay wireless communication portion of a downstream unit that is another second wireless communication unit via a downstream inter-unit wireless bearer,
the EPC function portion transmits a terminal wireless bearer setting request to the wireless base station portion, and the wireless base station portion constructs the terminal wireless bearer together with the mobile terminal according to conditions indicated by the terminal wireless bearer setting request
the relay wireless communication portion receives an -afi—upstream inter-unit wireless bearer setting request issued by an upstream EPC function portion of the upstream unit, and constructs the upstream inter-unit wireless bearer together with the upstream wireless base station portion according to conditions indicated by the upstream inter-unit wireless bearer setting request, and
the EPC function portion
includes a connected terminal node registration section in which, with respect to a plurality of the mobile terminals connected to the wireless base station portion via the terminal wireless bearer within a communication area of the wireless base station portion, pieces of node identification information of the connected mobile terminals are
registered, and performs control of collating a transmission destination node of an IP packet transferred from the wireless base station portion with registered content of the connected terminal node registration section, transferring, when the transmission destination node indicates a mobile terminal corresponding to any of the pieces of node identification information registered in the connected terminal node registration section, the IP packet to the mobile terminal in a form of returning the IP packet at the wireless base station portion, and transferring, when the transmission destination node indicates a node that is not registered in the connected terminal node registration section, the IP packet to a transmission destination outside the wireless communication unit from at least one of the relay wireless communication portion and the wireless base station portion,
wherein the wireless communication unit group is connected by the inter-unit wireless bearer in a positional relationship in which base station cells of a pair of wireless communication units adjacent to each other partially overlap each other, and a mobile terminal connected to one of the pair of wireless communication units and a mobile terminal connected to the other thereof perform transmission and reception of the IP packet via the pair of wireless communication units and the inter-unit wireless bearer connecting the pair of wireless communication units.

11. The wireless network system according to claim 10, wherein a mobile terminal connected to a first wireless communication unit forming one wireless communication unit of the wireless communication unit group including three or more sequentially connected by the inter-unit wireless bearer and a mobile terminal connected to a second wireless communication unit disposed across one or more intermediate wireless communication units with respect to the first wireless communication unit in the wireless communication unit group perform transmission and reception of the IP packet via the first wireless communication unit, the intermediate wireless communication units, the second wireless communication unit, and the inter-unit wireless bearer connecting the wireless communication units.

12. The wireless network system according to claim 11,
wherein each of the EPC function portions of the two or more wireless communication units sequentially connected by the inter-unit wireless bearer transfers node identification information of the mobile terminal connected to the wireless base station portion of each wireless communication unit to another wireless communication unit via the inter-unit wireless bearer such that the node identification information of the connected mobile terminal is shared between the two or more wireless communication units, and the EPC function portion creates a transfer table for the IP packet as the connected terminal node registration section based on the shared node identification information, and controls transfer of the IP packet with reference to the transfer table.

13. The wireless network system according to claim 12,
wherein at least one of the two or more wireless communication units includes a router provided between the EPC function portion and the relay wireless communication portion to relay transmission and reception of the IP packet between the EPC function portion and an external network, and when a transmission destination node of the transferred IP packet indicates a node that is not included in the transfer table, the EPC function portion of the wireless communication unit including the router performs control of transferring the IP packet to the external network via the router.

14. The wireless network system according to claim 10,
wherein a control interface for directly connecting the wireless base station portions of the pair of wireless communication units is omitted due to a configuration in which one wireless communication unit and the other wireless communication unit forming the pair of wireless communication units are communicatively connected by only the inter-unit wireless bearer, and when the mobile terminal connected to the one wireless communication unit moves into a communication cell of the other wireless communication unit, when the wireless base station portion of the other wireless communication unit receives an attachment request from the mobile terminal that has detected disconnection of the terminal wireless bearer connecting the wireless base station portion of the one wireless communication unit to the mobile terminal, a simple handover process of reconstructing the terminal wireless bearer between the wireless base station portion of the other wireless communication unit and the mobile terminal after movement is executed on the basis of a command from the EPC function portion of the other wireless communication unit.

15. The wireless network system according to claim 10, wherein a frequency channel used by the inter-unit wireless bearer that connects the two wireless communication units forming the pair of wireless communication units to each other is fixedly set to a frequency channel predefined as an inter-unit channel.

16. The wireless network system according to claim 15, wherein, in a configuration in which three or more of the wireless communication units are sequentially connected by a plurality of the inter-unit wireless bearers, the plurality of inter-unit wireless bearers adjacent to each other are constructed by using different inter-unit channels.

* * * * *